United States Patent
Contreras et al.

(10) Patent No.: US 10,947,437 B2
(45) Date of Patent: *Mar. 16, 2021

(54) CHEMICAL COMPOSITION OF SUPERABSORBENT VESICLES, METHOD FOR MORTAR CEMENT ADMIXTURE, AND APPLICATIONS OF THE SAME

(71) Applicant: SAUDI ARABIAN OIL COMPANY, Dhahran (SA)

(72) Inventors: Elizabeth Q. Contreras, Houston, TX (US); Carl Thaemlitz, Houston, TX (US)

(73) Assignee: SAUDI ARABIAN OIL COMPANY

( * ) Notice: Subject to any disclaimer, the term of this patent is extended or adjusted under 35 U.S.C. 154(b) by 0 days.

This patent is subject to a terminal disclaimer.

(21) Appl. No.: 16/807,552

(22) Filed: Mar. 3, 2020

(65) Prior Publication Data

US 2020/0199432 A1 Jun. 25, 2020

Related U.S. Application Data

(63) Continuation-in-part of application No. 16/230,391, filed on Dec. 21, 2018, now Pat. No. 10,619,085, and
(Continued)

(51) Int. Cl.
*E21B 43/16* (2006.01)
*C09K 8/46* (2006.01)
(Continued)

(52) U.S. Cl.
CPC .............. *C09K 8/46* (2013.01); *C04B 14/465* (2013.01); *C04B 24/04* (2013.01); *C04B 24/121* (2013.01);
(Continued)

(58) Field of Classification Search
CPC ........ C09K 8/487; C09K 8/467; C09K 8/493; C04B 20/1037; C04B 28/02;
(Continued)

(56) References Cited

U.S. PATENT DOCUMENTS 3,429,827 A 2/1969 Ruus
3,511,314 A 5/1970 Scott et al.
(Continued)

FOREIGN PATENT DOCUMENTS

CN 104086089 A 10/2014
GB 1229689 4/1971
(Continued)

OTHER PUBLICATIONS

Abatzoglou, N. et al., "A review of biogas purification processes", Biofuels, Bioproducts and Biorefining, 3, 42-71, 2009.
(Continued)

*Primary Examiner* — Silvana C Runyan
(74) *Attorney, Agent, or Firm* — Bracewell LLP; Constance Gall Rhebergen

(57) ABSTRACT

Embodiments provide a mortar slurry and a method for preparing a hardened mortar. The method includes the steps of: mixing an aramide capsule, a cement, a silica, and a water to form a mortar slurry; and allowing the mortar slurry to set to form the hardened mortar, where the aramide capsule is embedded in the hardened mortar. A continuous solvent and a surfactant are mixed to produce a continuous phase. A dispersed solvent and a dispersed monomer are mixed to produce a dispersed phase. The continuous solvent and a crosslinker are mixed to produce a crosslinker solution. The continuous phase and the dispersed phase are mixed to form a mixture having an emulsion such that the dispersed phase is dispersed as droplets in the continuous phase, where an interface defines the droplets of the dis-
(Continued)

persed phase dispersed in the continuous phase. The cross-linker solution is added to the mixture such that the cross-linker reacts with the dispersed monomer. An aramide polymer forms on the interface of the droplets, forming the aramide capsule. The aramide capsule is settled and separated from the mixture, and is dried to form a free flowing powder.

21 Claims, 21 Drawing Sheets

Related U.S. Application Data a continuation-in-part of application No. 16/018,336, filed on Jun. 26, 2018, now Pat. No. 10,669,469, which is a continuation of application No. 15/701,670, filed on Sep. 12, 2017, now Pat. No. 10,377,940.

(60) Provisional application No. 62/612,754, filed on Jan. 2, 2018, provisional application No. 62/397,126, filed on Sep. 20, 2016.

(51) Int. Cl.
| | | |
|---|---|---|
| C08F 283/04 | (2006.01) | |
| C04B 24/28 | (2006.01) | |
| C04B 24/12 | (2006.01) | |
| C04B 14/46 | (2006.01) | |
| C09K 8/467 | (2006.01) | |
| C04B 28/04 | (2006.01) | |
| C04B 24/04 | (2006.01) | |
| C04B 103/00 | (2006.01) | |

(52) U.S. Cl.
CPC ............ *C04B 24/287* (2013.01); *C04B 28/04* (2013.01); *C08F 283/04* (2013.01); *C09K 8/467* (2013.01); *E21B 43/16* (2013.01); *C04B 2103/0062* (2013.01)

(58) Field of Classification Search
CPC ..... C04B 24/121; C04B 24/287; C04B 28/04; C04B 2103/0046; C04B 2103/0062
See application file for complete search history.

(56) References Cited

U.S. PATENT DOCUMENTS

| | | | |
|---|---|---|---|
| 3,623,330 | A | 11/1971 | Nakade et al. |
| 4,107,292 | A | 8/1978 | Nemeth |
| 4,324,683 | A | 4/1982 | Lim et al. |
| 4,632,186 | A | 12/1986 | Boncan et al. |
| 5,049,167 | A | 9/1991 | Castro et al. |
| 5,095,987 | A | 3/1992 | Weaver et al. |
| 5,164,099 | A | 11/1992 | Gupta et al. |
| 5,211,234 | A | 5/1993 | Floyd |
| 5,368,102 | A | 11/1994 | Dewprashad et al. |
| 5,437,813 | A | 8/1995 | Akashi et al. |
| 5,631,559 | A | 3/1997 | Dillenbeck, III |
| 5,705,233 | A | 1/1998 | Denes et al. |
| 6,527,051 | B1 | 3/2003 | Reddy et al. |
| 6,554,071 | B1 | 4/2003 | Reddy et al. |
| 6,572,697 | B2 | 6/2003 | Gleeson et al. |
| 6,645,288 | B1 | 11/2003 | Dargaud et al. |
| 6,722,434 | B2 | 4/2004 | Reddy et al. |
| 6,761,220 | B2 | 7/2004 | Blauch et al. |
| 6,786,963 | B2 | 9/2004 | Matherly et al. |
| 7,363,978 | B2 | 4/2008 | Welton et al. |
| 7,476,713 | B2 | 1/2009 | Hild et al. |
| 7,569,630 | B2 | 8/2009 | Ma et al. |
| 7,914,884 | B2 | 3/2011 | Royer et al. |
| 8,029,709 | B2 | 10/2011 | Wu et al. |
| 8,251,143 | B2 | 8/2012 | Drochon et al. |
| 8,383,031 | B2 | 2/2013 | Naji et al. |
| 8,689,873 | B2 | 4/2014 | Abad et al. |
| 8,822,386 | B2 | 9/2014 | Quintero et al. |
| 8,895,104 | B2 * | 11/2014 | Na .......................... B01D 71/70 427/244 |
| 8,945,279 | B2 | 2/2015 | Aines et al. |
| 10,065,887 | B2 | 9/2018 | Kierat et al. |
| 2004/0171499 | A1 | 9/2004 | Ravi et al. |
| 2005/0203226 | A1 | 9/2005 | Mader et al. |
| 2006/0052251 | A1 | 3/2006 | Anderson et al. |
| 2006/0119926 | A1 | 6/2006 | Liu et al. |
| 2006/0144300 | A1 | 7/2006 | Touzet et al. |
| 2006/0264332 | A1 | 11/2006 | Welton et al. |
| 2007/0209794 | A1 | 9/2007 | Kaufman et al. |
| 2009/0062452 | A1 | 3/2009 | Harder et al. |
| 2010/0025039 | A1 | 2/2010 | Roddy et al. |
| 2011/0086941 | A1 | 4/2011 | Therond et al. |
| 2011/0226690 | A1 | 9/2011 | Kalayci |
| 2012/0165428 | A1 | 6/2012 | Tilara et al. |
| 2013/0295378 | A1 | 11/2013 | Bonin et al. |
| 2014/0262262 | A1 | 9/2014 | Zheng et al. |
| 2015/0099674 | A1 | 4/2015 | Lee et al. |
| 2015/0129207 | A1 | 5/2015 | Bastuba et al. |
| 2015/0159079 | A1 | 6/2015 | Huh et al. |
| 2015/0337620 | A1 * | 11/2015 | Fonseca Ocampos ..................... E21B 33/138 166/280.2 |
| 2016/0017215 | A1 | 1/2016 | Al-Muntasheri et al. |
| 2016/0017688 | A1 | 1/2016 | Chatterji et al. |
| 2016/0068745 | A1 | 3/2016 | Conway |
| 2016/0362594 | A1 | 12/2016 | Rojas et al. |
| 2017/0058191 | A1 | 3/2017 | Mahoney et al. |
| 2017/0073574 | A1 | 3/2017 | Mcdaniel et al. |
| 2017/0349805 | A1 | 12/2017 | Musso et al. |
| 2018/0079947 | A1 | 3/2018 | Contreras |
| 2018/0258336 | A1 | 9/2018 | Contreras |
| 2019/0031951 | A1 | 1/2019 | Johnson et al. |

FOREIGN PATENT DOCUMENTS

| | | |
|---|---|---|
| JP | 2004131361 A | 11/2005 |
| WO | 2014204677 A1 | 12/2014 |
| WO | 2017137789 A1 | 8/2017 |

OTHER PUBLICATIONS

Broadwater, S., et al; "One-pot multi-step synthesis: a challenge spawning innovation"; Organic & Biomolecular Chemistry, p. 2899-2906; 2005.
International Search Report and Written Opinion for related PCT application PCT/US2017/052367 dated Jan. 9, 2018.
International Search Report and Written Opinion for related PCT application PCT/US2018/066996 dated Mar. 22, 2019.
International Search Report and Written Opinion for related PCT application PCT/US2018/066998 dated Mar. 19, 2019.
Quevedo, E., et al., "Interfacial polymerization within a simplified microfluidic device: capturing capsules", Journal of the American Chemical Society, p. 10498-10499; 2005.
Siefers, AM, "A novel and cost-effective hydrogen sulfide removal technology using tire derived rubber particles"; Graduate Theses and Dissertation, p. 1-93; 2010.
Song et al., "Recent progress in interfacial polymerization", Materials Chemistry Frontiers, The Royal Society of Chemistry and the Chinese Chemical Society; 2017, pp. 1028-1040, vol. 1, No. 6.
Steinbacher et al.; "Polymer chemistry in flow: New polymers, beads, capsules, and fibers." Journal of Polymer Science Part A: Polymer Chemistry, p. 6505-6533; 2006.
Tadros, T., "Polymeric surfactants in disperse systems", Advances in Colloid and Interface Science, 2009, p. 281-299.
Wang, X. et al.; "Mesoporous-molecular-sieve-supported polymer sorbents for removing H2S from hydrogen gas streams"; Topics in Catalysis, 49, p. 108-117, 2008.

* cited by examiner

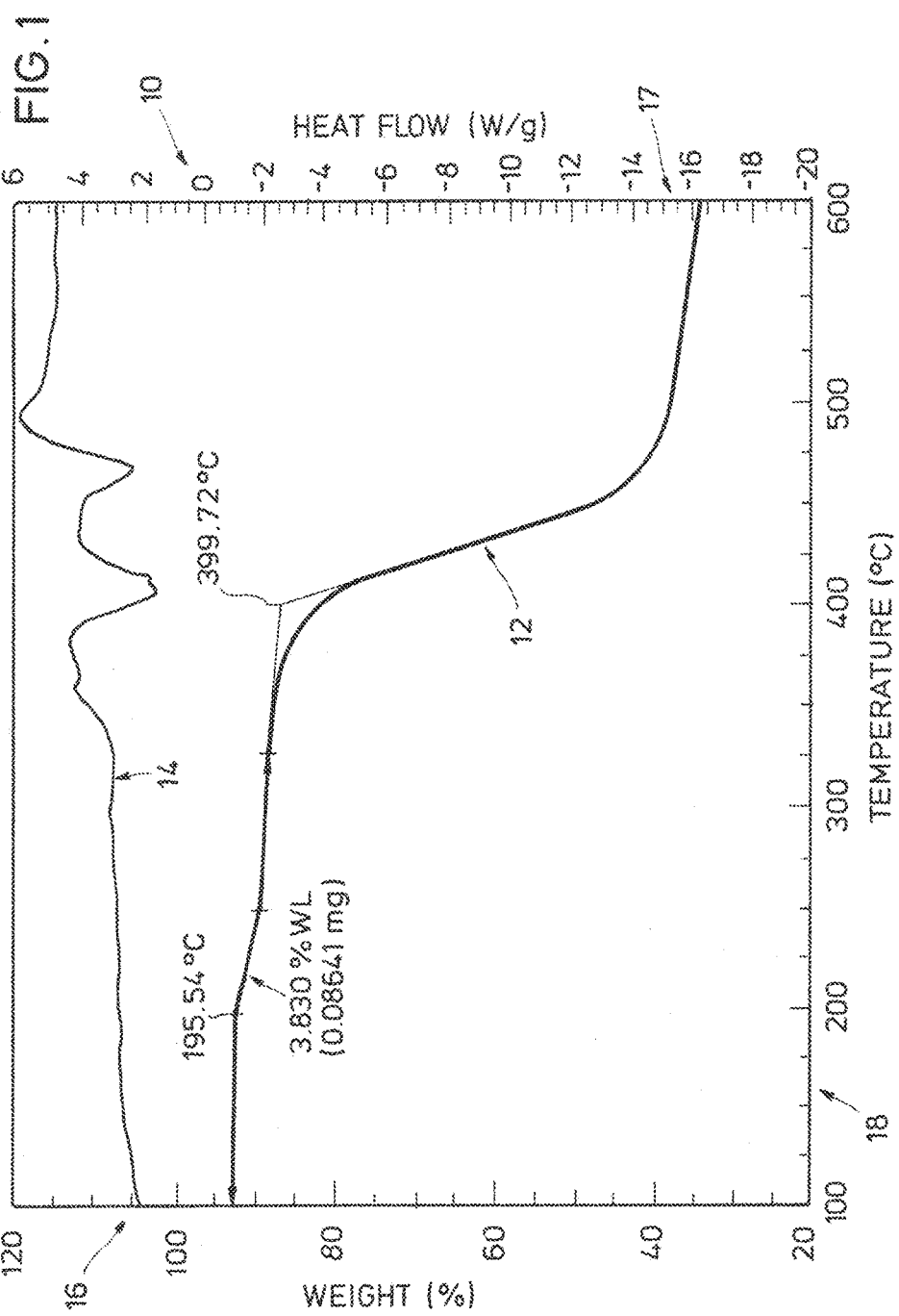

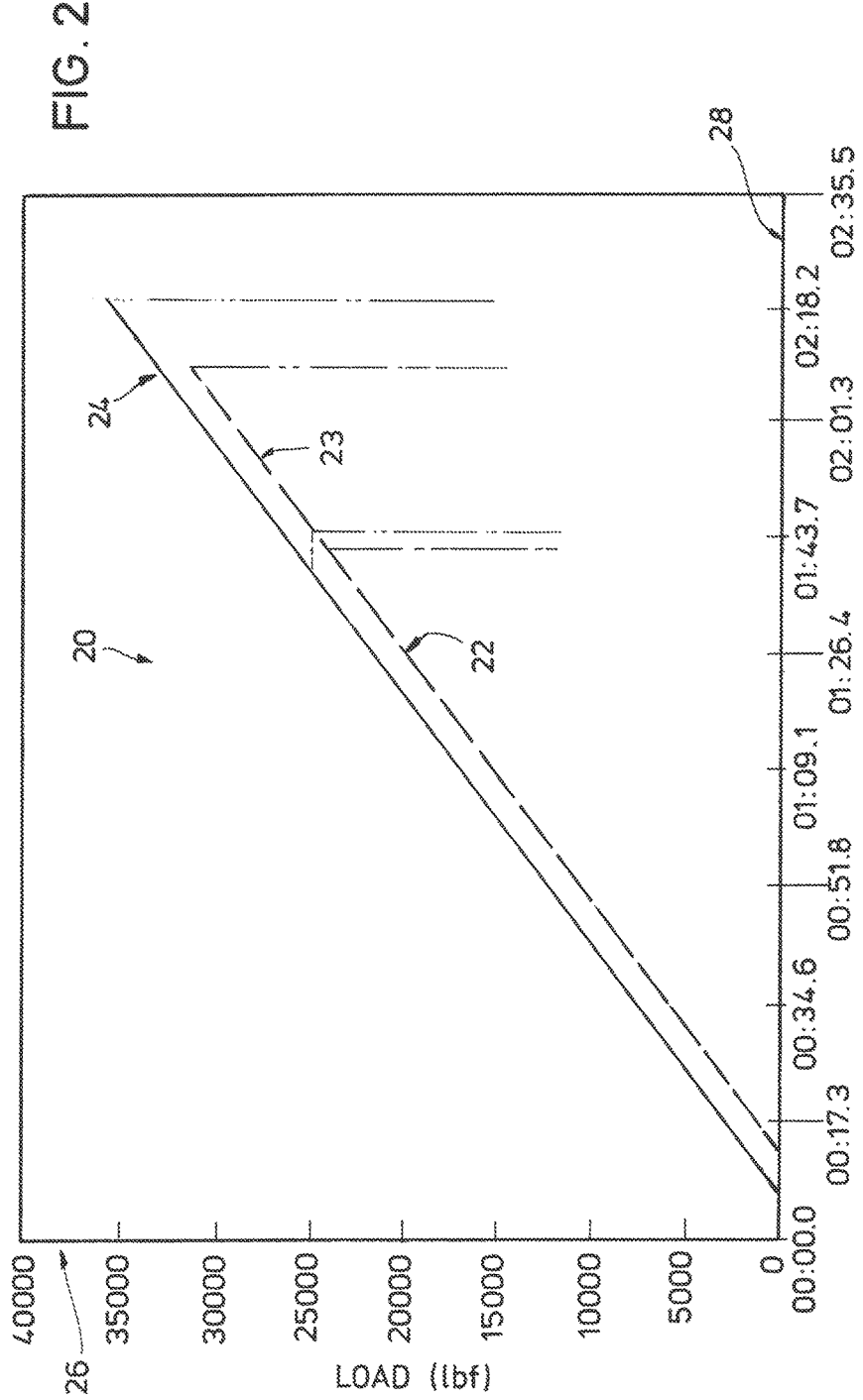

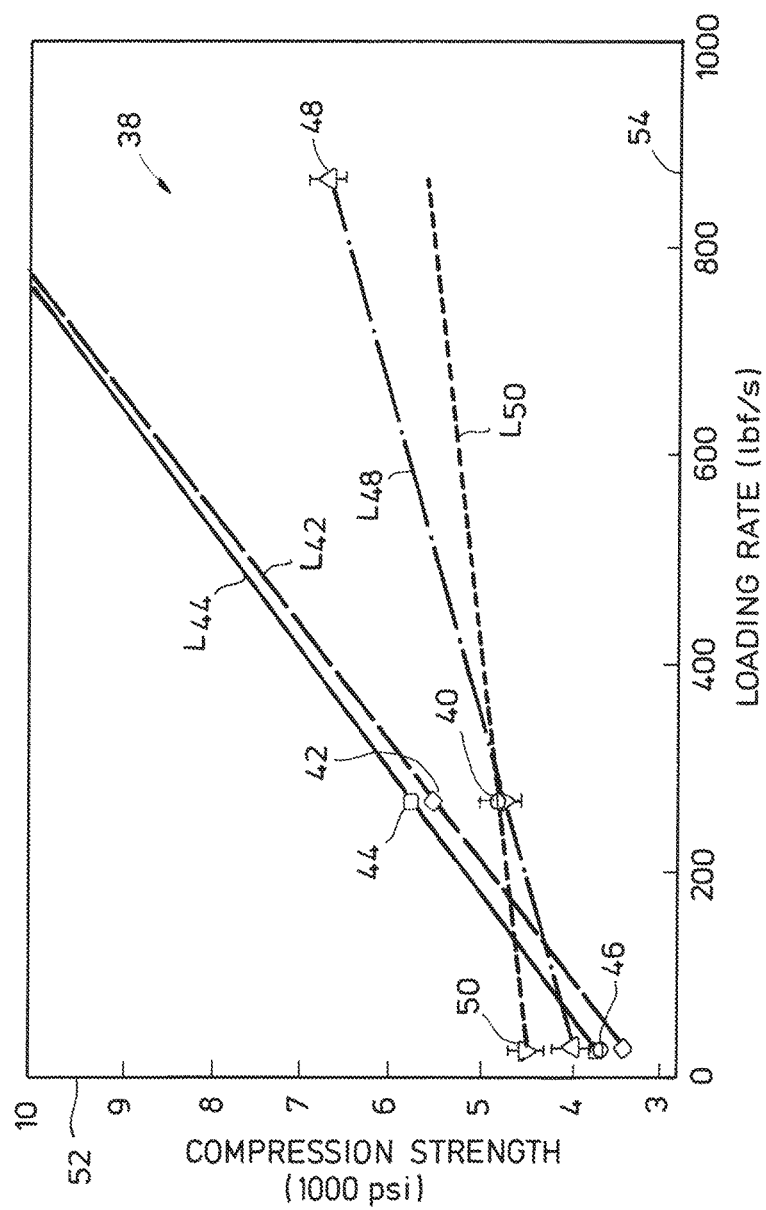

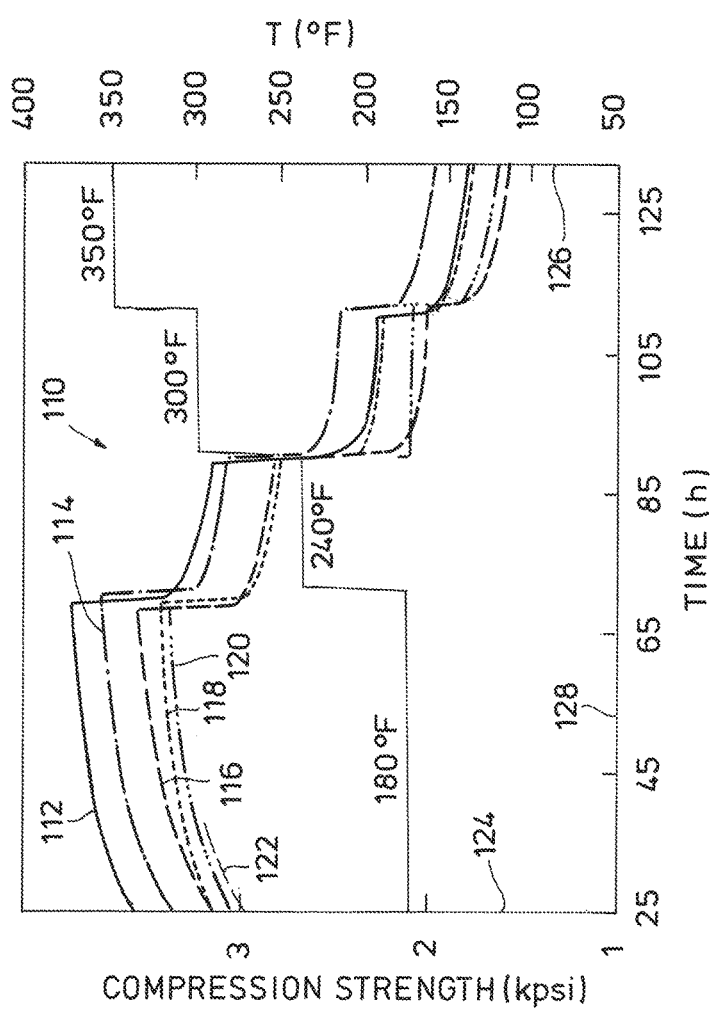

CHEMICAL COMPOSITION OF SUPERABSORBENT VESICLES, METHOD FOR MORTAR CEMENT ADMIXTURE, AND APPLICATIONS OF THE SAME

CROSS-REFERENCE TO RELATED APPLICATIONS

This application is a continuation-in-part application of U.S. patent application Ser. No. 16/018,336 filed Jun. 26, 2018, now issued as U.S. Pat. No. 10,669,469, which is a continuation application of U.S. patent application Ser. No. 15/701,670 filed Sep. 12, 2017, now issued as U.S. Pat. No. 10,377,940, which claims priority from U.S. Provisional Application Ser. No. 62/397,126 filed Sep. 20, 2016; this application is a continuation-in-part application of U.S. patent application Ser. No. 16/230,391 filed Dec. 21, 2018, now issued as U.S. Pat. No. 10,619,085, which claims priority from U.S. Provisional Patent Application No. 62/612,754 filed Jan. 2, 2018; all of the above-referenced applications are incorporated by reference in their entireties into this application.

BACKGROUND

1. Technical Field

The present disclosure relates to a cement, and method of making the cement, that bonds casing to a wellbore. More specifically, the present disclosure relates to a cement, and method of making the cement, that bonds casing to a wellbore, and that includes cross-linked polymers. In addition, the present disclosure relates to a mortar, and method of making the mortar. More specifically, the present disclosure relates to a mortar, and method of making the mortar, that includes cross-linked polymer capsules.

2. Related Art

Hydrocarbons that are produced from subterranean formations typically flow from the formations to surface via wellbores drilled from surface that intersect the formations. Most wellbores are lined with casing and strings of production tubing inserted within the casing that are for conveying the hydrocarbons to surface. The casing is usually bonded to the inner surface of the wellbore with a cement that is injected into an annulus that is between the casing and wellbore. In addition to anchoring the casing within the wellbore, the cement also isolates adjacent zones within the formation from one another. Without the cement isolating these adjacent zones fluids from the different zones, which are sometimes different, could become mixed in the annular space between the casing and wellbore wall. When one of the different fluids is water, separating it from the hydrocarbon is required. Further, if the water producing zone is at a pressure exceeding that of a hydrocarbon producing zone, water sometimes migrates into the hydrocarbon producing zone to thereby reduce the hydrocarbon producing potential of the wellbore.

The cement also prevents hydrocarbon fluid from flowing uphole from a hydrocarbon producing zone to the surface and in the annulus between the casing and the wellbore wall. Without the cement, or in instances when cement has failed, hydrocarbons are known to migrate to surface and then present a safety hazard to operations personnel. One problematic area for gas migration exists for deep wells, where fluid densities often as high as 22 pounds per gallon are used to control gas or formation fluid influx. To control gas migration, cement densities for successfully cementing of the zone of interest are sometimes as high as 22.7 pounds per gallon. As a cement slurry sets, hydrostatic pressure is reduced on the formation. During this transition, reservoir gases can travel up through the cement column resulting in gas being present at the surface. The permeable channels from which the gas flows cause operational and safety problems at the well site. Causes of gas channeling include: (1) bad mud/spacer/cement design that allows passage of water and gas resulting in failures in cementing operations; (2) high fluid loss from cement slurries, which causes water accumulation and results in micro-fractures within the cement body; and (3) cements not providing sufficient hydrostatic pressure to control the high pressure formation.

In many wellbores, cement can be used to form a layer between a casing and the formation. Delivery of additives to the cement can be problematic for a variety of reasons. First, the additives must be mixed with the cement slurry and delivered along with the slurry to the downhole location. Second, the additives must survive intact at the extreme downhole conditions in order to impart their additive properties. Third, controlling the release rate of an additive can be difficult in a downhole environment.

Encapsulation-based systems are of interest in the oil and gas industry in applications such as chemical additive preservation, small molecule release, particle delivery, and self-sealing materials. Many methods are used to encapsulate relevant chemical additives for the controlled release of contents. Example capsulation materials include polymeric coatings, inorganic shells, and mesoporous materials.

When placing cement in a wellbore, a multitude of additives (usually in large quantities) are considered and added to the slurry in order to meet a variety of functional needs suitable for diverse wellbore conditions. However, using large quantities of certain additives (for example, retarders and fluid loss control agents) may destabilize the slurry at the surface even before introducing the slurry into the wellbore.

SUMMARY

Disclosed are compositions and methods for use in cement slurries. Specifically, disclosed are compositions and methods for controlling a downhole environment during cement operations.

Embodiments of the disclosure provide an example of a cement composition for use in a wellbore and that includes a cement, a calcium silicate in the cement, and an aramide compound that is formed from a trifunctional carboxylic acid and an organic compound comprising nitrogen. Examples exist where the diamine is one of ethylenediamine, 1,3-diaminobenzene, 1,4-diaminobenzene, 1,6-diaminohexane, 1,4-phenylenediamine, or combinations. In one example, the 1,6-diaminohexane is mixed with sebacoyl chloride. In one example, the organic compound having nitrogen includes a diamine. Optionally the aramide is one or more of poly(ethylene trimesoylamide), poly-(meta-phenylene trimesoylamide), poly-(para-phenylene trimesoylamide), poly(hexamethylene trimesoylamide), poly(hexamethylene-co-sebacoyl trimesoylamide), poly-(para-phenylene trimesoylamide), and a blend of poly-(meta-phenylene trimesoylamide) and poly(hexamethylene trimesoylamide). In one embodiment, the aramide compound is a aramide condensate compound. In an alternative, the aramide compound is cross-linked.

Embodiments of the disclosure also provide an example of a cement composition for use in a wellbore is disclosed and that includes a cement and an amide compound that is formed from an aromatic triacid chloride and an organic compound having nitrogen. An example exists where a polyamide compound is included with the amide compound. A silica, such as crystalline silica or calcium silicate, is optionally included with the cement composition. In one alternative, the amine is a diamine, such as ethylenediamine, 1,3-diaminobenzene, 1,4-diaminobenzene, 1,6-diaminohexane, 1,4-phenylenediamine, and combinations. The triacid chloride can be 1,3,5-benzenetricarboxylic acid chloride. Optionally, the organic compound having nitrogen is an amine. The amide compound is alternatively cross-linked.

Embodiments of the disclosure also provide a method of forming a cement composition for use in a wellbore, and which includes forming an amide by combining a trifunctional carboxylic acid with an organic compound having nitrogen, combining an amount of cement, water, and the amide to form a mixture, and curing the mixture to form a cement composition. In one example the amide is a cross-linked polyamide. The polyamide can be an aramide having a molecular weight that ranges from about 189 Daltons to about 555 Daltons. The organic compound that having nitrogen optionally includes diamine. In one example, the diamine is one of ethylenediamine, 1,3-diaminobenzene, 1,4-diaminobenzene, 1,6-diaminohexane, 1,4-phenylenediamine, and combinations, and is mixed with sebacoyl chloride. Curing the cement can advantageously occur inside of a wellbore.

Embodiments of the disclosure also provide a system for the controlled release of encapsulated cargo that utilizes engineered features of permeable polymeric shell walls. Using vesicles or capsules, cement additives can be delivered without physical or chemical modification. Various cement formulations can be designed utilizing numerous combinations of vesicles with various encapsulants. Vesicle systems are particularly useful for delivering agents such as chemical additives and small molecules to provide beneficial interactions in cement slurry applications. Such cement slurry applications include chemical delivery and controlled release of chemical additives during placement of a slurry downhole.

In one aspect, a method for encapsulating a cement additive for use in a wellbore includes the step of mixing a continuous solvent and a surfactant to produce a continuous phase. The method includes the step of mixing a dispersed solvent, a dispersed monomer, and the cement additive to produce a dispersed phase. The dispersed solvent and the continuous solvent are immiscible. The method includes the step of mixing the continuous phase and the dispersed phase to form a mixture having an emulsion such that the dispersed phase is dispersed as droplets in the continuous phase. An interface defines the droplets of the dispersed phase dispersed in the continuous phase. The method includes the step of adding a crosslinker to the mixture. The method includes the step of allowing an aramide polymer to form on the interface of the droplets, such that the aramide polymer forms a semi-permeable membrane around a core. The core contains the dispersed phase, such that the semi-permeable membrane around the core forms the aramide capsule. The method includes the step of allowing the aramide capsule to settle from the mixture. The method includes the step of separating the aramide capsule from the mixture using a separation method.

In certain aspects, the dispersed solvent can include water, ethanol, and methanol. In certain aspects, the dispersed monomer includes an amine group. In certain aspects, the dispersed monomer can include ethylenediamine, meta-phenylenediamine, para-phenylenediamine, and hexamethylenediamine. In certain aspects, the continuous solvent can include oil, mineral oil, cyclohexane, and chloroform. In certain aspects, the crosslinker can include 1,3,5-benzenetricarbonyl trichloride and sebacoyl chloride. In certain aspects, the cement additive is water-soluble and can include sealing reagents, anti-gas migration additives, high-temperature retarders, fluid-loss additives, accelerators, and superplasticizers.

In one aspect, a method for controlled release of a cement additive for use in a wellbore includes the step of mixing an aramide capsule with a cement slurry to form an additive-containing slurry. The method includes the step of introducing the additive-containing slurry into the wellbore. The aramide capsule is formed by the step of mixing a continuous solvent and a surfactant to produce a continuous phase. The aramide capsule is formed by the step of mixing a dispersed solvent, a dispersed monomer, and the cement additive to produce a dispersed phase. The dispersed solvent and the continuous solvent are immiscible. The aramide capsule is formed by the step of mixing the continuous phase and the dispersed phase to form a mixture having an emulsion such that the dispersed phase is dispersed as droplets in the continuous phase. An interface defines the droplets of the dispersed phase dispersed in the continuous phase. The aramide capsule is formed by the step of adding a crosslinker to the mixture. The aramide capsule is formed by the step of allowing an aramide polymer to form on the interface of the droplets, such that the aramide polymer forms a semi-permeable membrane around a core. The core contains the dispersed phase, such that the semi-permeable membrane around the core forms the aramide capsule. The aramide capsule is formed by the step of allowing the aramide capsule to settle from the mixture. The aramide capsule is formed by the step of separating the aramide capsule from the mixture using a separation method.

In certain aspects, the method further includes the step of allowing the cement additive to permeate from the core through the semi-permeable membrane to the cement slurry. The method further includes the step of allowing the cement additive to have a beneficial interaction with the cement slurry. In certain aspects, the method further includes the step of allowing the additive-containing slurry to set to form a hardened cement. The aramide capsule is embedded in the hardened cement. The method further includes the step of allowing the cement additive to permeate from the core through the semi-permeable membrane to the hardened cement. The method further includes the step of allowing the cement additive to have a beneficial interaction with the hardened cement. In certain aspects, the hardened cement has an unconfined compression strength ranging from about 3,000 pounds per square inch (psi) to about 3,400 psi. In certain aspects, the method further includes the step of allowing the additive-containing slurry to set to form a hardened cement. The aramide capsule is embedded in the hardened cement. The method further includes the step of allowing the semi-permeable membrane to burst such that the cement additive is released from the aramide capsule and migrates through the hardened cement. The method further includes the step of allowing the cement additive to have a beneficial interaction with the hardened cement. In certain aspects, the hardened cement has an unconfined compression strength ranging from about 3,000 psi to about 3,400 psi.

In certain aspects, the dispersed solvent can include water, ethanol, and methanol. In certain aspects, the dispersed monomer includes an amine group. In certain aspects, the dispersed monomer can include ethylenediamine, meta-phenylenediamine, para-phenylenediamine, and hexamethylenediamine. In certain aspects, the continuous solvent can include oil, mineral oil, cyclohexane, and chloroform. In certain aspects, the crosslinker can include 1,3,5-benzenetricarbonyl trichloride and sebacoyl chloride. In certain aspects, the cement additive is water-soluble and can include sealing reagents, anti-gas migration additives, high-temperature retarders, fluid-loss additives, accelerators, and superplasticizers. In certain aspects, the aramide polymer of the aramide capsule is present in the additive-containing slurry at a concentration of at least about 3% by weight of cement. In certain aspects, the cement additive is tethered in the core of the aramide capsule via site-isolation of a water-soluble polymer.

In one aspect, an aramide capsule for use in a cement environment includes a semi-permeable membrane including an aramide polymer. The semi-permeable membrane forms a shell with a core, such that the core contains a cement additive. The semi-permeable membrane is operable to allow the cement additive to permeate from the core through the semi-permeable membrane to the cement environment. The aramide capsule includes the cement additive. The cement additive is operable to impart a beneficial interaction on the cement environment. The aramide polymer includes subunits derived from a monomer including a di-functional amino group and subunits derived from a crosslinker including an acyl chloride.

In certain aspects, the aramide capsule further includes a linear polymer. The linear polymer is water-soluble and is operable to tether the cement additive in the core via site-isolation. In certain aspects, the linear polymer can include polyethylene glycols, polystyrenes, polyethylene imine, polyvinyl alcohols, and polyvinylpyrrolidone. In certain aspects, the monomer can include ethylenediamine, meta-phenylenediamine, para-phenylenediamine, and hexamethylenediamine. In certain aspects, the crosslinker can include 1,3,5-benzenetricarbonyl trichloride and sebacoyl chloride. In certain aspects, the cement additive is water-soluble and can include sealing reagents, anti-gas migration additives, high-temperature retarders, fluid-loss additives, accelerators, and superplasticizers.

Embodiments of the disclosure provide a method for preparing a hardened mortar. The method includes the step of mixing an aramide capsule, a cement, a silica, and a water to form a mortar slurry. The aramide capsule is formed by the step of mixing a continuous solvent and a surfactant to produce a continuous phase. The aramide capsule is formed by the step of mixing a dispersed solvent and a dispersed monomer to produce a dispersed phase. The dispersed solvent and the continuous solvent are immiscible. The aramide capsule is formed by the step of mixing the continuous solvent and a crosslinker to produce a crosslinker solution. The aramide capsule is formed by the step of mixing the continuous phase and the dispersed phase to form a mixture having an emulsion such that the dispersed phase is dispersed as droplets in the continuous phase. An interface defines the droplets of the dispersed phase dispersed in the continuous phase. The aramide capsule is formed by the step of adding the crosslinker solution to the mixture such that the crosslinker reacts with the dispersed monomer. The aramide capsule is formed by the step of allowing an aramide polymer to form on the interface of the droplets, such that the aramide polymer forms a semi-permeable membrane around a core. The core contains the dispersed phase, such that the semi-permeable membrane around the core forms the aramide capsule. The aramide capsule is formed by the step of allowing the aramide capsule to settle from the mixture. The aramide capsule is formed by the step of separating the aramide capsule from the mixture using a separation method. The aramide capsule is formed by the step of drying the aramide capsule such that the core is hollow. The aramide capsule exists as a free flowing powder. The method includes the step of allowing the mortar slurry to set to form the hardened mortar. The aramide capsule is embedded in the hardened mortar.

In some embodiments, the mortar slurry has a water-to-cement ratio ranging between 0.4 and 0.6. In some embodiments, the aramide polymer of the aramide capsule is present in the mortar slurry at a concentration ranging between 0.5% and 5% by weight of the cement. In some embodiments, the method further includes the step of allowing water to permeate from the hardened mortar through the semi-permeable membrane to the core. In some embodiments, the aramide capsule is in its expanded form. In some embodiments, the method further includes the step of allowing water to permeate from the core through the semi-permeable membrane to the hardened mortar. In some embodiments, the aramide capsule is in its contracted form. In some embodiments, the hardened mortar has a density ranging between 2,100 and 2,200 kilograms per cubic meter. In some embodiments, the hardened mortar has an unconfined compressive strength ranging between 35 and 40 megapascals and a tensile strength ranging between 6 and 8 megapascals. In some embodiments, the aramide capsule has a diameter ranging between 100 and 200 microns and a wall thickness ranging between 3 and 5 microns. In some embodiments, the dispersed solvent includes water, ethanol, methanol, and combinations of the same. In some embodiments, the dispersed monomer includes 1,4-diaminobenzene, 1,3-diaminobenzene, 1,6-diaminohexane, and combinations of the same. In some embodiments, the continuous solvent includes cyclohexane, chloroform, and combinations of the same. In some embodiments, the crosslinker is 1,3,5-benzenetricarbonyl trichloride. In some embodiments, the molar ratio of the dispersed monomer and the crosslinker ranges between 1 and 2. In some embodiments, the step of mixing the aramide capsule, the cement, the silica, and the water to form the mortar slurry further includes mixing a dispersant including a superplasticizer.

Embodiments of the disclosure also provide a mortar slurry. The mortar slurry includes a cement, a silica, a water, and an aramide capsule. The aramide capsule includes a semi-permeable membrane including an aramide polymer. The semi-permeable membrane forms a shell with a hollow core. The shell is configured to expand and contract depending on osmotic properties of a surrounding fluid. The water is configured to permeate to and from the core through the semi-permeable membrane. The aramide polymer includes a first subunit derived from a dispersed monomer including 1,4-diaminobenzene, 1,3-diaminobenzene, 1,6-diaminohexane, and combinations of the same, and a second subunit derived from a crosslinker including 1,3,5-benzenetricarbonyl trichloride. The first subunit and the second subunit form an amide group therebetween.

In some embodiments, the mortar slurry has a water-to-cement ratio ranging between 0.4 and 0.6. In some embodiments, the aramide polymer of the aramide capsule is present in the mortar slurry at a concentration ranging between 0.5% and 5% by weight of the cement. In some embodiments, the aramide capsule has a diameter ranging between 100 and 200 microns and a wall thickness ranging between 3 and 5 microns. In some embodiments, the mortar slurry further includes a dispersant including a superplasticizer.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

FIG. 1 is a graphical representation showing weight loss percent versus temperature of a cross linked polyamide as disclosed here.

FIG. 2 is a graphical representation showing plots reflecting compressive loads applied to cement samples versus time.

FIG. 4 is a graphical representation showing plots of compression strength of cement samples versus a loading rate.

FIGS. 6A and 6B are graphical depictions respectively of compression strength and Young's modulus measured over time and at varying temperature of different cements.

FIG. 14A shows the state of the aramide capsules filled with water which occurs when osmotically wetted with a hypotonic fluid or an isotonic fluid, or both. FIG. 14B shows the state of the aramide capsules crenated after being dried into a free-flowing power or being osmotically wetted with a hypertonic fluid.

Figure 3A:
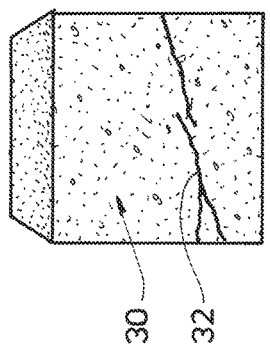
FIGS. 3A-3C are perspective views of the cement samples loaded to obtain the data presented in FIG. 2.

In the accompanying Figures, similar components or features, or both, may have a similar reference label.

DETAILED DESCRIPTION

The disclosure refers to particular features, including process or method steps and systems. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude. The word "substantially" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words are for descriptive convenience and are not limiting unless otherwise indicated.

Embodiments of the disclosure provide an example of a cement composition that is used in a wellbore for bonding a tubular to sidewalls of the wellbore; and that blocks axial flow in an annulus between the tubular and the wellbore sidewalls. Blocking flow through the annulus isolates vertically spaced apart portions of the formation from one another. In an embodiment, the cement composition includes a polymer. An example of the composition having the polymer experienced a 25% increase in compressive strength over that of compositions having latex.

In an example embodiment, the cement composition includes a mixture of cement, water, and polymer. An optional anti-foaming agent can be included in the mixture. In an embodiment where the cement is a Portland cement, the cement includes tri-calcium silicate ($C_3S$) and di-calcium silicate ($C_2S$). When mixed with water, both $C_3S$ and $C_2S$ can hydrate to form calcium silicate hydrate (C—S—H) gel. Further, in one example embodiment, the polymer is a cross-linked polymer. In another example embodiment, the polymer is a polyamide, and can be a cross-linked polyamide. Yet further optionally, the polymer is an aramide; examples exist where the aramide is a cross-linked aramide. In one embodiment the polyamide is formed by a condensation reaction. In an optional example, the condensation reaction is between monomers. Examples exist where the polyamide is aliphatic, and examples exist where the polyamide is aromatic. In an example, the polymer was produced using a monomer that mimics the flexibility of a nylon using a long carbon-chain monomer, and the rigidity and strength of an aramide using an aromatic monomer. In an alternative, the polymer is synthesized by reacting a trifunctional monomer with a bifunctional monomer. In an embodiment, the polymer, the polyamide, or the aramide products are linear, branched, or networked. Alternatives exist where the polymer, the polyamide, or the aramide condensates are formed using a trifunctional monomer, which for the purposes of discussion here is referred to as a crosslinker; accordingly, such formed products are correspondingly referred to as being crosslinked.

Embodiments of the disclosure provide compositions and methods directed to cement additive delivery systems. Advantageously, the composition and methods described here can mitigate gas migration and the formation of microannuli in cement slurries. Advantageously, the compositions and methods can increase the compression strength following the thickening time, decreasing the permeability of the hardened cement. Advantageously, the compositions and methods described can provide high-temperature cement additives that enable the delivery of cement additives at controlled release after a cement slurry has been placed in a wellbore.

Chemical additives are frequently used for designing cement slurry formulations to produce reliable cement sheaths for well construction. However, the chemical additives may not properly function at wellbore conditions where the extreme temperature and pressure may alter the desired chemical functionalities of the additives. Advantageously, the chemical additives (for example, a dispersant or an accelerator) can be encapsulated by methods incorporating interfacial polymerization, such that the chemical additives are placed within a hollow polymer shell and shielded from extreme wellbore conditions. The shells are designed for the delayed release of the chemical additives providing molecular and temporal control for field applications. Similar to chemical additives, interfacial polymerization can be employed for encapsulating engineered additives. The engineered additives can also be placed within the hollow polymer shell for the controlled release of the additives in the wellbore.

As used throughout, "capsule" refers to one or more particles of particular combination of semi-permeable membrane and cement additive. A reference to the singular capsule includes multiple particles. A reference to the plural capsules is a reference to compositions of different semi-permeable membranes.

As used throughout, "shell" refers to an enclosure that completely surrounds a core.

As used throughout, "semi-permeable" means that certain components are able to pass through. The ability for a component to pass through a semi-permeable membrane depends on the size and charge of the component.

As used throughout, "shearing rate" refers to the mixing speed when forming the emulsion-based capsules.

As used throughout, "beneficial interaction" means the cement additive imparts a benefit to the cement slurry or hardened cement or the properties of the cement slurry or hardened slurry. "Benefit" as used here means a positive impact. Non-limiting examples of beneficial interactions include sealing the cement to mitigate micro-annuli formation of set cements during the lifetime of the well and releasing cement additives in a controlled fashion as the slurry is mixed with the additives or as the mixed slurry is introduced downhole. Non-limiting examples of beneficial interactions also include gas migration control and enhancing mechanical properties of set cement.

As used throughout, "cement environment" refers collectively any stage of the cement process and includes both the cement slurry and the hardened cement.

As used throughout, "immiscible" means not forming a homogeneous mixture when two or more solvents are added together. Immiscible solvents may form an emulsion. Non-limiting examples of immiscible solvents include oil and water, and cyclohexane and water.

As used throughout, "wellbore" refers to a hole drilled into a subsurface formation of the earth, where the subsurface formation can contain hydrocarbons. The wellbore can have a depth from the surface and a diameter and can transverse the subsurface formation vertically, horizontally at a parallel to the surface, or at any angle between vertically and parallel.

As used throughout, "aramide" refers to an aromatic polyamide. Terms such as "aramids," "aramides," "polyaramids," "polyaramides," "aramid polymers," "aramide polymers," and "aromatic polyamides" are used interchangeably. Commercial examples of aramides include para-aramides such as Kevlar® (available from DuPont®, Wilmington, Del.), Technora® (available from Teijin Aramid USA, Inc, Conyers, Ga.), Twaron® (available from Teijin Aramid USA, Inc, Conyers, Ga.), and Heracron® (available from Kolon Industries, Inc., Gwachon, Korea), and meta-aramides such as Nomex® (available from DuPont®, Wilmington, Del.) and Teijinconex® (available from Teijin Aramid USA, Inc, Conyers, Ga.). A para-aramide is an aramide where the polymer chain is connected via the para positions of an acyl group subunit or functional group. A meta-aramide is an aramide where the polymer chain is connected via the meta positions of an acyl group subunit or functional group.

The aramide capsule can be composed of a cement additive encapsulated by a semi-permeable membrane. The aramide capsule can have a specific gravity of between 1.0 and 1.5, alternately of between 1.2 and 1.4. The specific gravity of the aramide capsule is comparable to the specific gravity of aramides.

The cement additive can be any cement additive imparting a beneficial interaction to the cement environment. Cement additives can include sealing reagents, anti-gas migration additives, accelerators, high-temperature retarders, fluid-loss additives, accelerators, superplasticizers, and combinations of the same. Sealing reagents can be any material capable of self-sealing fractured cement. Sealing reagents can include polymers, salts, rubber, water, latexes, epoxy, silicones, and combinations of the same. Sealing reagents can include a polymer with a $T_g$, that is, a glass transition temperature where polymers become soft and flowable. In cases where the cement is compromised with micro-cracks, these sealing reagents self-seal the hardened cement to increase the workable lifetime of the well. In some embodiments, the cement additive is in a free-flowing powder form and is added, either wetted or not, to the dry mix when producing a slurry formulation. In some embodiments, the cement additive is water-soluble and can be dissolved in the dispersed solvent to form a dispersed phase.

The semi-permeable membrane can be an aramide polymer that is semi-permeable. The semi-permeable membrane can be a crosslinked aramide polymer. The aramide polymer can be formed through a polycondensation reaction. The polycondensation reaction can form other polymers suitable for the semi-permeable membrane, such as polyesters, polyurethanes, and polyureas. Examples of the aramide polymer that can form the semi-permeable membrane include polyamides, aramides, and combinations of the same. The semi-permeable membrane forms a shell encapsulating a core. The core contains the cement additive. The core can be a liquid core. Advantageously, aramides have high-temperature resistance and ballistic-rated strength. The semi-permeable membrane can be heat resistant up to temperatures of 400 deg. C. The semi-permeable membrane can maintain the integrity of the cement additive, resist chemical contamination of the cement additive, and keep the cement additive from degrading in the presence of the cement slurry until desired. The semi-permeable membrane can allow the cement additive to permeate from the core to outside the cement additive capsule. The cement additive can permeate through the semi-permeable membrane via osmosis, fluid displacement, or mechanical rupture. The semi-permeable membrane provides for a controlled release rate of the cement additive. The extent of crosslinking of the aramide polymer can determine the permeability of the semi-permeable membrane. The release rate can be controlled by adjusting the permeability of the semi-permeable membrane.

The aramide capsule can be formed through the method of interfacial polymerization. In the process of interfacial polymerization two immiscible fluids, such as a continuous phase and a dispersed phase, are blended together until the dispersed phase is dispersed as droplets in the continuous phase forming an emulsion. At least one phase contains a monomer and a crosslinker can be included in the other phase and the aramide polymer can form on the interface between the dispersed droplet and the continuous phase forming a shell around the droplet of the dispersed phase, such that the dispersed phase is captured within the shell. The shell formed through interfacial polymerization is the semi-permeable membrane.

The continuous phase can include a continuous solvent and a surfactant. In at least one embodiment, the continuous phase includes a crosslinker. In at least one embodiment, the crosslinker is added after the dispersed phase and the continuous phase have been blended. The continuous solvent can be any polar or non-polar solvent immiscible with water. Non-polar solvents suitable for use as the continuous solvent include oil, mineral oil, cyclohexane, chloroform, and combinations of the same. The crosslinker can be any acyl chloride monomer. Examples of crosslinkers include 1,3,5-benzenetricarbonyl trichloride, sebacoyl chloride, and combinations of the same. The surfactant can include sorbitan esters, polyethoxylated sorbitan esters, and combinations of the same.

The dispersed phase can include a dispersed solvent, a dispersed monomer, and the cement additive. The dispersed solvent can be any aqueous solvent that is immiscible with the continuous solvent. In at least one embodiment, the dispersed solvent can include water. The dispersed monomer can be any water-soluble diamine. The dispersed monomer can be any diamine monomer including a di-functional amino group. Examples of dispersed monomers include ethylenediamine, meta-phenylenediamine, para-phenylenediamine, hexamethylenediamine, and combinations of the same. The cement additives can be heterogeneous or solubilized. The cement additives can be blended into the dispersed phase. In at least one embodiment, the cement additives can be dissolved in the dispersed solvent to form the dispersed phase. In at least one embodiment, the dispersed phase can include a metal oxide.

The continuous phase solvent and the dispersed phase solvent can be selected such that the two fluids are immiscible with each other.

The continuous monomer and the dispersed monomer can be selected together in consideration of the properties of the aramide polymer that forms the semi-permeable membrane. The continuous monomer and the dispersed monomer can be selected to produce polyamides, aramides, polyesters, polyurethanes, polyureas, and combinations of the same. In at least one embodiment, the dispersed monomer can include ethylenediamine, meta-phenylenediamine, para-phenylenediamine, and combinations of the same. The crosslinker can include 1,3,5-benzenetricarbonyl trichloride. In at least one embodiment, the dispersed monomer can include hexamethylenediamine and the crosslinker can include sebacoyl chloride.

The amount of crosslinker added to the continuous phase can control permeability of the semi-permeable membrane. More than one continuous monomers or dispersed monomers can be used to control permeability of the semi-permeable membrane.

The continuous phase and the dispersed phase are blended together until the dispersed phase is dispersed as droplets in the continuous phase forming an emulsion. Depending on the volume of each phase a water-in-oil (w/o) emulsion or an oil-in-water (o/w) emulsion can be formed. The droplets can have different shapes including spheres, rods, fibers, and combinations of the same. The size of the droplets of the dispersed phase can be between 50 nanometers (nm) and 50 microns (μm), alternately between 100 nm and 1 μm, alternately between 1 μm and 10 μm, and alternately between 10 μm and 50 μm. The size and shape of the droplets of the dispersed phase in the continuous phase can be controlled by the shearing rate, the use of laminar flow, the dispersed solvent, the density of the dispersed solvent, the rate of blending of the continuous solvents and dispersed solvent, and viscosity of the dispersed phase. In at least one embodiment, laminar flow can be used form fibers. The size of the droplets can be optimized to impart a low rheological property to the cement slurry.

In at least one embodiment, the cement additive is insoluble in water but soluble in organic solvents. The continuous phase includes water as the continuous solvent and the dispersed phase includes the organic solvent as the dispersed solvent. Mixing the two phases may form an o/w emulsion for applications in oil-based drilling fluids.

In at least one embodiment, the crosslinker is present in the continuous phase when the two phases are blended together as a mixture and the aramide polymer begins to form as the emulsion is created. In at least one embodiment, the crosslinker is added to the mixture after the emulsion of dispersed droplets in the continuous phase has been developed.

The aramide polymer forms on the interface of the dispersed droplet and the continuous phase creating the aramide capsules. The polymerization reaction occurs at room temperature. The polymerization results in a covalently bonded crosslinked aramide polymer. The mixture is stirred to enhance homogeneity of the aramide polymer. In at least one embodiment, the mixture can be stirred for a period from about 24 hours to about 72 hours. In at least one embodiment, the aramide capsules can settle to the bottom of the reactor. In a next step, the aramide capsules are separated from the liquids remaining. The separation method used to separate the aramide capsules can be any process capable of separating a liquid and leaving behind dry capsules as a free-flowing powder. Separation methods can include decantation, filtration, centrifuging, rotary evaporation, vacuum drying, oven drying, and combinations of the same. In at least one embodiment, the separation method leaves a liquid at the core, creating a liquid filled capsule. In at least one embodiment, the separation method results in desiccation of the aramide capsule removing the liquid in the core. In at least one embodiment, the dry capsules can be washed to remove any residue of the continuous phase and then dried.

Additional reagents that can be added to the continuous phase and the dispersed phase include emulsifiers and viscosifiers. In at least one embodiment, the emulsifier added to the continuous phase is sorbitan trioleate. In at least one embodiment, the emulsifier added to the dispersed phase is polyethoxylated sorbitan ester.

The aramide capsule can be used to provide beneficial interaction with the cement environment. The aramide capsule is mixed with a cement slurry to form an additive-containing slurry. In at least one embodiment, the aramide capsule can be mixed with a cement slurry according to the API RP 10-B standard. The aramide capsule can be mixed with the cement slurry as a free-flowing dry powder, as liquid-filled capsules, or as part of a liquid emulsion. The aramide capsule can be used with any type of cement slurry. In at least one embodiment, the cement in the cement slurry is hydrophilic. In at least one embodiment, the cement slurry includes a class G Portland cement. In at least one embodiment, the cement additive is present in the cement slurry at a concentration of between 0.05% by weight of cement (bwoc) and 5% bwoc. In at least one embodiment, the aramide polymer of the semi-permeable membrane is present in the cement slurry at a concentration of at least 3% bwoc. In at least one embodiment, two or more aramide capsules can be added to the cement slurry, such that two or more different cement additives are carried into the cement slurry. The aramide capsule can be mixed within the cement slurry to distribute the aramide capsule through the cement slurry. The additive-containing slurry can be introduced to the formation according to any process for placing cement in a wellbore or formation. FIG. 1 is a photographic representation of the aramide capsules embedded in a cement slurry, as imaged by optical microscopy at ambient conditions.

The cement slurry sets into a hardened cement such that the aramide capsules are embedded in the hardened cement. In some embodiments, the hardened cement including the aramide capsules exhibits an unconfined compression strength ranging from about 2,500 psi to about 3,500 psi at about 350° F. for about 120 hours. In other embodiments, the hardened cement including the aramide capsules exhibits an unconfined compression strength ranging from about 2,800 psi to about 3,500 psi at about 350° F. for about 120 hours. Still in other embodiments, the hardened cement including the aramide capsules exhibits an unconfined compression strength ranging from about 3,000 psi to about 3,400 psi at about 350° F. for about 120 hours. For comparison, neat cement exhibits an unconfined compression strength in similar conditions ranging from about 3,000 psi to about 4,000 psi, from about 3,400 psi to about 3,700 psi, or from about 3,500 psi to about 3,600 psi. Also for comparison, latex-containing hardened cement exhibits an unconfined compression strength in similar conditions ranging from about 1,500 psi to about 2,500 psi, from about 1,800 psi to about 2,300 psi, or from about 1,900 psi to about 2,200 psi. In some embodiments, the hardened cement including the aramide capsules exhibits a confined compression strength ranging from about 5,000 psi to about 14,000 psi at room temperature. In other embodiments, the hardened cement including the aramide capsules exhibits a confined compression strength ranging from about 9,000 psi to about 12,000 psi at room temperature.

In at least one embodiment, the cement additive permeates from the core of the aramide capsule through the semi-permeable membrane to the cement environment surrounding the aramide capsule. In at least one embodiment, semi-permeable membrane of the aramide capsule can burst under the stress of the hardened cement. The cement additive then migrates through the cement environment. After the cement additive leaves the aramide capsules, the remaining aramide polymer of the semi-permeable membrane can impart strengthening properties to the matrix of the hardened cement.

In at least one embodiment, the beneficial interaction of the cement additive is to seal the cement. Sealing the cement makes the cement resistant to the influx of formation gases.

In at least one embodiment, the cement additive is tethered in the core of the aramide capsule via site-isolation using a linear polymer. The cement additive can be tethered to the semi-permeable membrane, tethered within the semi-permeable membrane, or tethered onto the semi-permeable membrane. In at least one embodiment, the cement additive can be site-isolated using linear polymers, such as polyethylene glycols (PEGs), polystyrenes, polyethylene imine, polyvinyl alcohols, polyvinylpyrrolidone, and combinations of the same. These linear polymers are typically water-soluble. The side chains of these linear polymers can be designed to contain the cement additive via chelation. Non-limiting examples of tethered cement additives include salts, accelerators, and metal catalysts. In other embodiments, these linear polymers can be cleaved such that the cleaved molecules can travel through the semi-permeable membrane. For example, linear polymers having carboxylic acid groups can be cleaved such that the cleaved molecule having the carboxylic acid group may serve as a cement retarder. In some embodiments, a viscosifier can be used to site-isolate the encapsulant.

Cement ductility refers to a measure of cement reliability where cement integrity is enhanced by making cement more elastic and ductile. Advantageously, the semi-permeable membrane of the aramide capsule improves cement ductility.

In at least one embodiment, the aramide capsule is in the absence of a molecular sieve.

As used throughout, "superabsorbent polymer" refers to a polymer that can absorb and retain a quantity of liquid greater than its own weight. A superabsorbent polymer can absorb greater than about 10 times its own weight, alternately greater than about 50 times its own weight, or alternately greater than about 100 times its own weight.

As used throughout, "sand" refers to a granular material including finely divided rock and mineral particles including silica. The sand can exist in any form capable of forming a cement or mortar slurry, such as silica flour, silica sand, course sand, fine sand, or aggregates. In at least one embodiment, the sand is compliant to the CEN standard for mortar or concrete applications.

As used throughout, "superplasticizer" refers to a cement additive including chemical compounds that enable the production of hardened concrete, hardened cement, or hardened mortar using at least 15% less water than the conventional water requirement.

In construction, a mixture of water, cement, and sand serves as a binder to hold building materials together. Chemical additives can be used in such cement or mortar slurries to enhance the structural integrity of the hardened cement or mortar. Polymer additives such as latexes, dispersible polymer powders, and resins can be added in cement or mortar slurries to mitigate drying, shrinkage, and cracking, which are frequently observed in hardened cement or mortar. For example, a superabsorbent polymer can be used as an additive to mitigate shrinkage in hardened cement or mortar due to its water-absorbing nature.

Embodiments of the disclosure provide an aramide capsule in the absence of a cement additive. Without the cement additive, the aramide capsule has a hollow interior which can expand or contract depending on the osmotic properties of a surrounding fluid being in contact with the exterior of the aramide capsule. Fluids such as water can permeate through the semi-permeable membrane to the core when the aramide capsule is dry or surrounded with a hypotonic solution. On the other hand, fluids such as water can permeate from the core of a water-containing aramide capsule through the semi-permeable membrane to the surrounding environment when the water-containing aramide capsule is surrounded with a hypertonic solution. The aramide capsule is robust enough to survive multiple cycles of expansion and contraction without being ruptured. Advantageously, the aramide capsule can be used in a cement or mortar to extend the lifespan of the cement or mortar by holding and releasing water.

In some embodiments, the aramid capsule formed as a result of interfacial polymerization has an average diameter ranging between about 10 µm and about 500 µm, alternately between about 50 µm and about 300 µm, or alternately between about 100 µm and about 200 µm. In some embodiments, the aramide capsule formed as a result of interfacial polymerization has an average wall thickness ranging between about 1 µm to about 10 µm, alternately between about 2 µm and about 7 µm, or alternately between about 3 µm and about 5 µm. In at least one embodiment, the aramide capsule has an average wall thickness of about 4 µm. The percent yield of the aramide capsule can range between about 5% and about 100%, alternately between about 5% and about 80%, or alternately between about 5% and about 70%. In at least one embodiment, the percent yield of the aramide capsule is about 60%. The density of the dried aramide capsule can range between about 1 gram per milliliter (g/ml) and about 1.7 g/ml, alternately between about 1.2 g/ml and 1.6 g/ml, or alternately between about 1.3 g/ml and 1.5 g/ml, indicative of an aromatic polyamide material. In at least one embodiment, the density of the dried aramide capsule is about 1.3 g/ml.

In at least one embodiment, the aramide capsule is used as a superabsorbent polymer in cement or mortar applications. The aramide capsule can be mixed with the cement or mortar slurry as a free-flowing dry powder or as water-filled capsules. The aramide capsule can be used with any type of cement or mortar slurry. In at least one embodiment, sand or silica can be mixed with the aramide capsule-containing cement slurry to form a mortar slurry. The aramide capsule can be used with any type of mortar slurry. The mortar slurry can have a water-to-cement weight ratio of between about 0.1 and about 1, alternately between about 0.4 and about 0.7, and alternately between about 0.45 and about 0.5. In at least one embodiment, the mortar slurry has a water-to-cement weight ratio of about 0.5. In at least one embodiment, the aramide polymer of the aramide capsules is present in the cement slurry or mortar slurry at a concentration of between about 0.1% bwoc and about 5% bwoc, alternately between about 0.3% bwoc and about 3% bwoc, or alternately between about 0.5% bwoc and about 1% bwoc. In at least one embodiment the aramide polymer of the aramide capsules is present in the cement slurry or mortar slurry at a concentration of about 0.5% bwoc. In at least one embodiment, the aramide polymer of the aramide capsules is present in the cement slurry or mortar slurry at a concentration of about 0.6% bwoc. The aramide capsule can be mixed within the cement slurry or mortar slurry to distribute the aramide capsule through the cement slurry or mortar slurry.

The cement slurry or mortar slurry can set into a hardened cement or hardened mortar such that the aramide capsules are embedded in the hardened cement or hardened mortar. The hardened cement or hardened mortar are humidity-controlled due to the aramide capsule being robust enough to survive multiple cycles of expansion and contraction without being ruptured. For example, the aramide capsules included in the hardened cement or hardened mortar can absorb water in a humid environment. On the other hand, in a dry environment, the water-containing aramide capsules can release water to the hardened cement or hardened mortar to keep the hardened cement or hardened mortar hydrated.

In some embodiments, the hardened cement or hardened mortar can have a density ranging between about 1800 kilograms per cubic meter ($kg/m^3$) and about 2400 $kg/m^3$, alternately between about 2,000 $kg/m^3$ and about 2,300 $kg/m^3$, or alternately between about 2,100 $kg/m^3$ and about 2,200 $kg/m^3$. In some embodiments, the hardened cement or hardened mortar can have a compressive strength ranging between about 30 megapascals (MPa) and about 50 MPa, alternately between about 35 MPa and about 45 MPa, or alternately between about 35 MPa and 40 MPa. In some embodiments, the hardened cement or hardened mortar can have a tensile strength ranging between about 3 MPa and about 10 MPa, alternately between about 4 MPa and about 9 MPa, or alternately between about 6 MPa and 8 MPa. In some embodiments, the hardened cement or hardened mortar can have a compressive-to-tensile strength ratio ranging between about 3 and about 10, alternately between about 4 and about 8, or alternately between about 5 and about 7.

In some embodiments, the cement slurry or mortar slurry can include a dispersant. The dispersant can include a superplasticizer. Non-limiting examples of superplasticizers include Ethacryl G (Arkema, Colombes, France), ADVA XT2 (W.R. Grace and Co., Columbia, Md.), ADVA 600 (W.R. Grace and Co., Columbia, Md.), ADVA 198 (W.R. Grace and Co., Columbia, Md.), sulfonated acetone-formaldehyde condensate (SAFC), and sulfonated naphthalene-formaldehyde condensate (SNFC).

In some embodiments, the cement slurry or mortar slurry can include an additive such as silica. The silica can include silica flour and silica sand. The silica can have a density ranging between about 2.08 g/mL and about 2.65 g/mL. The silica can have a maximum particle size ranging between about 10 μm and about 1,000 μm, alternately between about 50 μm and about 500 μm, or alternately between about 100 μm and about 300 μm.

In some embodiments, the cement or mortar including the aramide capsules allow the cement or mortar to expand in volume. The semi-permeable shell allows the osmotic uptake of water, which causes the volume of the dry aramide capsules to increase such that the overall volume of the cement or mortar increases. In comparison, conventional expanding agents such as magnesium oxide (MgO) expand upon the dissolution of the coating surrounding the expanding agent or upon gas generation by using a gas generating additive. As such, the expansion of cement or mortar using conventional expanding agents involves a delay. However, the expansion of the cement or mortar including the aramide capsules as an expanding agent does not involve such delay. In some embodiments, the uptake of water can be tailored by controlling the permeability of the polymer shell and controlling the size of the aramide capsules.

Advantageously, the cement or mortar including the aramide capsules can be used in water-abundant construction to prevent water leaks, such as in mines and dams. Such expanding cement or mortar can prevent water leaks; upon expansion, the cement or mortar can fill in any cracks, leaks, or potential leaks. In some embodiments, a dry cement or mortar mixture can be placed in a water leaking zone, where the leaking water can be osmotically taken up by the aramide capsules such that the dry mixture is hydrated and set to form a hardened seal, preventing further influx of water.

Advantageously, the aramide capsules embedded in the cement or mortar can serve as an expanding agent to produce a tight seal against any placement in cement applications. For example, the cement or mortar including the aramide capsules can be used in situ, providing a tight seal against the casing and the formation zone to isolate different formations (such as a gas formation, an underground water table, or other hydrocarbon zones) after the completion of drilling into the production zone. Isolating a gas formation allows to prevent pressure buildup behind the casing. Isolating an underground water table allows to prevent halite formation above the water table. In addition, the cement or mortar including the aramide capsules can be used for zonal isolation.

Advantageously, the physical and chemical properties of the aramide capsules, which allow the cement or mortar to expand during early stages of setting and post-setting, can provide an anti-shrinkage effect. Accordingly, fractures, cracks, and other imperfections can be prevented from forming.

Advantageously, the cement slurry or mortar slurry including the aramide capsules can be used to fill fractures, cracks, and other imperfections that may be present downhole. After placement and upon setting, the cement or mortar expands in volume to fill any voids and form a tight seal.

In some embodiments, the cement or mortar including the aramide capsules can be used in conventional cement applications, such as in civil construction.

EXAMPLES

The disclosure is illustrated by the following examples, which are presented for illustrative purposes only, and are not intended as limiting the scope of the invention which is define by the appended claims.

Example 1

In one non-limiting example, a polyamide was prepared by condensation of an aromatic tri-acid chloride with diamine at room temperature by interfacial polymerization.

1,3,5-benzenetricarboxylic acid chloride, trimesic acid trichloride, and trimesoyl chloride are examples of a tri-acid chloride. The diamine was dissolved in water or ethanol and added to a chloroform-cyclohexane solution containing an equal stoichiometric amount of the tri-acid chloride; an emulsifier was also added. Example diamines include ethylenediamine, 1,3-diaminobenzene, 1,4-diaminobenzene, 1,6-diaminohexane, 1,6-diaminohexane (mixed with sebacoyl chloride), and 1,4-phenylenediamine. In an embodiment, carboxylic acid is used in lieu of the tri-acid chloride.

Example 2

The reaction of 1,3,5-benzenetricarboxylic acid chloride with ethylenediamine and having a molar ratio of 2:3, which produces Polymer A is provided in Equation 1 below.

Equation 1

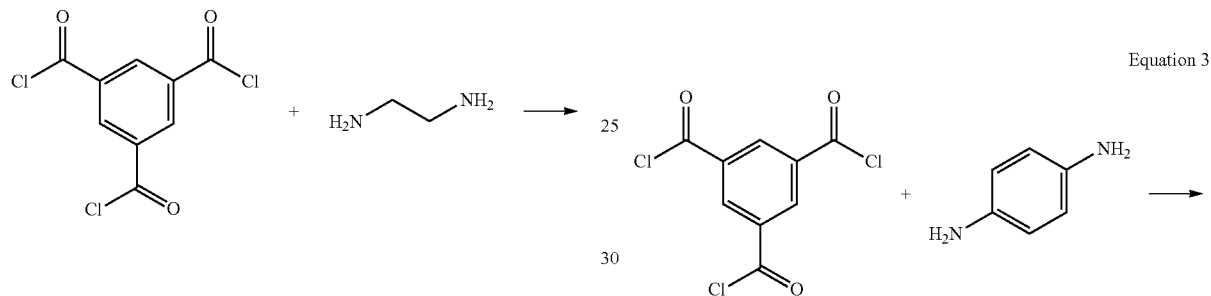

The molecular weight of Polymer A is 189 Daltons.

Example 3

The reaction of 1,3,5-benzenetricarboxylic acid chloride with 1,3-diaminobenzene and having a molar ratio of 2:3, which produces Polymer B, is provided in Equation 2 below.

Equation 2

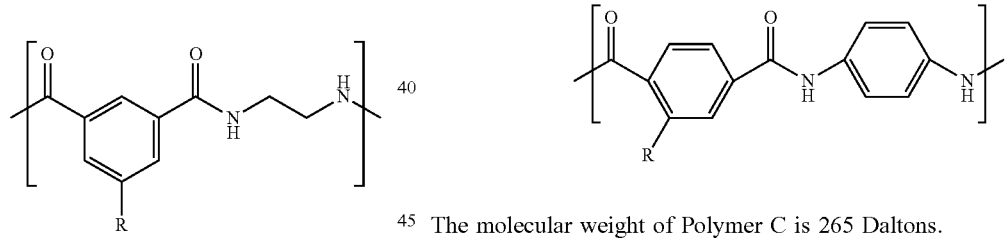

The molecular weight of Polymer B is 265 Daltons.

Example 4

The reaction of 1,3,5-benzenetricarboxylic acid chloride with 1,4-diaminobenzene and having a molar ratio of 2:3, which produces Polymer C, is provided in Equation 3 below.

Equation 3

The molecular weight of Polymer C is 265 Daltons.

Example 5

The reaction of 1,3,5-benzenetricarboxylic acid chloride with 1,6-diaminohexane and having a molar ratio of 2:3, which produces Polymer D, is provided in Equation 4 below.

Equation 4

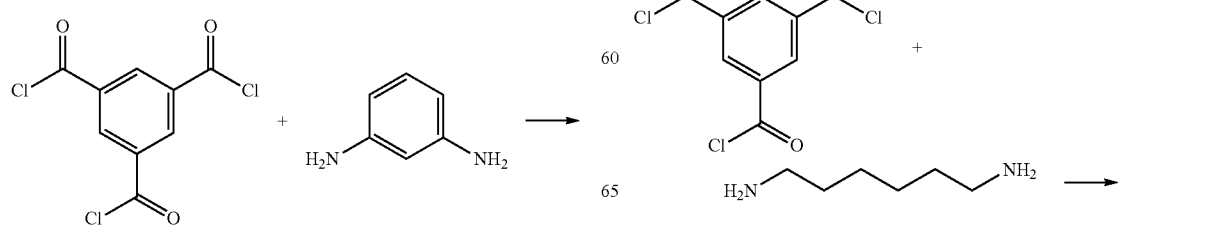

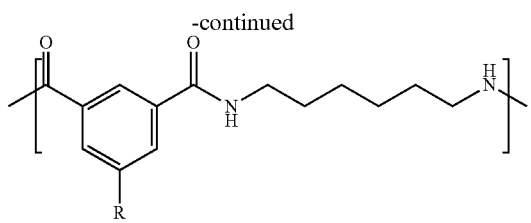

The molecular weight of Polymer D is 273 Daltons.

Example 6

The reaction of 1,3,5-benzenetricarboxylic acid chloride with 1,6-diaminohexane mixed with sebacoyl chloride and having a molar ratio of 1:3:1, which produces Polymer E, is provided in Equation 5 below.

Equation 5

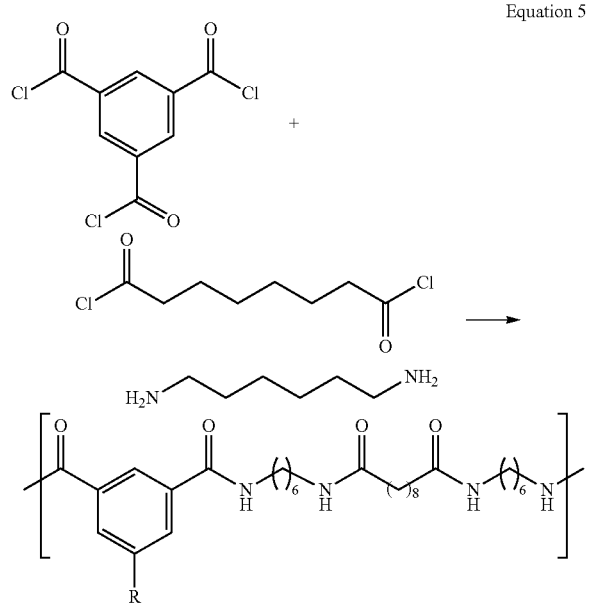

The molecular weight of Polymer E is 555 Daltons.

Reactant ratios for forming Polymer A are not limited to that provided in Example 2 above. Alternative examples of producing Polymer A exist using amounts of 1,3,5-benzenetricarboxylic acid chloride in a range of from one to four and amounts of ethylenediamine in a range of two to six. Reactant ratios for forming Polymer B are not limited to that provided in Example 3 above. Alternative examples of producing Polymer B exist using amounts of 1,3,5-benzenetricarboxylic acid chloride in a range of from one to four and amounts of 1,3-diaminobenzene in a range of two to six. Reactant ratios for forming Polymer C are not limited to that provided in Example 4 above. Alternative examples of producing Polymer C exist using amounts of 1,3,5-benzenetricarboxylic acid chloride in a range of from one to four and amounts of 1,3-diaminobenzene in a range of two to six. Reactant ratios for forming Polymer D are not limited to that provided in Example 5 above. Alternative examples of producing Polymer D exist using amounts of 1,3,5-benzenetricarboxylic acid chloride in a range of from one to four and amounts of 1,6-diaminohexane in a range of two to six. Reactant ratios for forming Polymer E are not limited to that provided in Example 6 above. Alternative examples of producing Polymer E exist using amounts of 1,3,5-benzenetricarboxylic acid chloride in a range of from one to four, amounts of 1,6-diaminohexane in a range of two to six, and amounts of sebacoyl chloride in a range of from one to four.

Example 7

In a non-limiting example of use, an organic phase of 750 milliliters (ml) mixture of a 4:1 ratio of cyclohexane to $CHCl_3$ and two percent by volume of Span 85 is added to a 2 liter two-neck round bottom flask and stirred at 600 revolutions per minute (rpm) using a Caframo® BDC 2002 overhead stirrer. An aqueous solution of 200 ml of the diamines (1,6-diaminohexane, 1,4-diaminobenzene, 1,3-diaminobenzene, and ethylenediamine) is added to form an emulsion, which is stirred for 30 minutes. In preparation of interfacial polymerization, a solution of 26.5 grams of cross-linker 1,3,5-benzenetricarboxylic acid chloride dissolved in 200 ml of chloroform/$CHCl_3$ was added to the emulsion at a rate of 1 ml/minute, and the resulting solution was stirred for 1-2 hours. Advantageously, no heating was applied to the reactants during polymerization or during stirring. The resulting polymer was allowed to settle, and then decanted and washed with 500 ml of diethyl ether, 500 ml of tetrahydrofuran, and 500 ml of ethanol. The polymer was then transferred to a 250 ml round bottom flask, where it was concentrated by rotary evaporation and dried at temperature of 180 Fahrenheit (° F.) until a constant weight of free flowing powder was achieved. The bands of the infrared spectrum of 1,3-diaminobenzene and 1,4-diaminobenzene were measured after each condensation reaction.

In a non-limiting prophetic example a polymer is produced using the following constituents: 25.3 percent by weight of chloroform (solvent), 52.9 percent by weight of cyclohexane (continuous phase), 1.4 percent by weight of 1,6-diaminohexane, 2.4 percent by weight of 1,3,5-benzenetricarboxylic acid chloride, 0.1 percent by weight of surfactant, and 17.9 percent by weight of water (dispersed phase). The cyclohexane, chloroform, and surfactant are combined in a first mixing tank (not shown), and then seventy-five percent by volume of this solution is transferred to a reactor (not shown). In a second mixing tank (not shown), the 1-6 diaminohexane is dissolved in water and then added to the reactor to form an emulsion. In a third mixing tank (not shown) the 1,3,5-benzenetricarboxylic acid chloride is dissolved in the remaining twenty-five percent of the cyclohexane, chloroform, and surfactant mixture. The contents of the third mixing tank are added to the reactor at a constant rate to polymerize the emulsion; a byproduct of which is hydrochloric acid gas. The reactor contents are stirred for 24 hours for homogeneity. The polymer will settle in the reactor, and takes the form of a powder by removing the solvents and drying the polymer.

In an example, Polymer A is referred to as poly(ethylene trimesoylamide), Polymer B is referred to as poly-(meta-phenylene trimesoylamide), Polymer C is referred to as poly-(para-phenylene trimesoylamide), Polymer D is referred to as poly(hexamethylene trimesoylamide) (or crosslinked-"PA6T"-trimesoylamide), Polymer E is referred to as poly(hexamethylene-co-sebacoyl trimesoylamide) (crosslinked-"nylon610"-trimesoylamide), and Polymer E is referred to as poly-(para-phenylene trimesoylamide). Embodiments exist where Polymers A-E are formed in accordance with Example 1 above, and in an alternative, embodiments exist where Polymers A-E are formed in accordance with Example 7 above.

In one alternative, the polymer solution was stirred for 24 hours for homogeneity. A free-flowing powder was obtained by decanting, rotary evaporation, and filtration. Then, the polymer was further dried in an oven at 180° F. overnight or until a constant weight was achieved. To measure the heat resistance of the crosslinked aramide, a thermogravimetric analysis (TGA) technique was used to continuously measure the weight of a sample as a function of temperature (Q600 TGA, TA Instruments). High heat resistance is a characteristic of aramides.

Example 8

In one non-limiting example, a cement was prepared having a polymer. Example polymers for this example include Polymers A-E, a 1:1 blend of Polymers B and D, and combinations. A cement slurry was formed having four components: water, cement, 3% by weight of cement of the polymer applied, and anti-foamer. Optionally, the amount of polymer in the slurry can range from about 0.5% by weight of cement ("bwoc") to about 5% bwoc. This range may be doubled and increased for more favorable results. Here, a 600-mL cement slurry with defoamer and polymer was prepared, where 24.2 grams of the polymer added to 806.9 grams of cement and 340.2 grams of water to make a 16.0 pound per gallon (ppg) cement. Any type of cement can be used in the cement slurry, including all Portland cements, any type of cement as classified by the American Society for Testing and Materials (ASTM), such as Type I, II, II, or V, any type of cement as classified by the American Petroleum Institute (API), such as Class A, C, G, or H, cements where latexes has been applied, white, pozzolana, and the like. Portland cements are described in API specification for "Materials and Testing for Well Cements", API 10B-2 of the American Petroleum Institute. Embodiments exist having no additional chemical additives. Following API standards the slurry was blended at a mixing rate of 4,000 rpm for 14 seconds (s) and then increased to 12,000 rpm for 35 s. After mixing, the slurry was then poured into cube molds (2 cubic inches) or cylinder molds (2-inch diameter by 4-inch height). The samples were then placed into a curing chamber, where the cement remained for 72 hours at conditions of 180° F. and 3,000 pounds per square inch (psi). After curing, the cement was removed from the curing chamber and the sample surface prepared to measure its mechanical properties, such as compression strength.

Example 9

In a non-limiting example of forming a neat cement, 782.2 grams of Saudi G cement was mixed with 348.9 grams of water, which produced a slurry with a volume of 600 ml and a density of 15.8 ppg. The slurry was blended at 4,000 rpm for 15 s and blended at 12,000 rpm for 35 s, and poured into a brass mold. Inside the mold the cement was cured at 180° F. for 72 hours, and at a pressure of 3,000 psi. The ends of the samples were planed after curing so that surfaces of the samples were parallel. Examples of the cement are listed in Example 7 above.

Example 10

In a non-limiting example of use, a cement was prepared having 789.2 grams of Saudi G cement, 348.9 grams of water, and 23.7 grams (3% bwoc) of one of Polymers A-E, a 1:1 blend of Polymers B and D, and combinations. A 600-mL cement slurry as prepared having a density of 15.8 ppg. The slurry was blended at 4,000 rpm for 15 s, then blended at 12,000 rpm for 35 s, and poured into a brass mold. Inside the mold the cement was cured at 180° F. for 72 hours, and at a pressure of 3,000 psi. The ends of the samples were planed after curing so that surfaces of the samples were parallel. Examples of the cement are listed in Example 7 above.

Example 11

In a non-limiting example of use, a cement for prepared having 789.2 grams of Saudi G cement, 294.4 grams of water, 47.4 grams of a 50% latex solution (6% bwoc), and 7.1 grams of a stabilizer (15% by weight of the latex). Latex candidates include carboxylated latexes, and carboxylated styrene-butadiene latexes. The slurry was blended at 4,000 rpm for 15 s and blended at 12,000 rpm for 35 s, and poured into a brass mold. Inside the mold the cement was cured at 180° F. for 72 hours, and at a pressure of 3,000 psi. The ends of the samples were planed after curing so that surfaces of the samples were parallel. Examples of the cement are listed in Example 7 above.

Analysis of the polyamide synthesized from Equation 2 above demonstrated a material with a high temperature resistance up to 400° Celsius (° C.), and with weight loss of less than 4% at 195° C. In contrast, styrene-butadiene rubber (SBR) latexes have recommended maximum operating temperatures of 82° C. to 100° C. Shown in graphical form in FIG. 1 is an example of a graph 10 reflecting data obtained by analyzing the polyamide synthesized in Example 4. Graph 10 includes a line 12 that represents weight loss data and which was obtained by thermogravimetric analysis. Another line 14 is included with graph 10 and that represents data obtained using a differential scanning calorimetry. Values for weight percent are shown scaled along a left hand ordinate 16, values for heat flow (W/g) are scaled along a right hand ordinate 17, and an abscissa 18 provides a scale for temperature (° C.). Line 12, thus illustrates percent weight loss of the Equation 2 polyamide with respect to temperature, and shows that the polyamide percent weight loss remains substantially linear up to around 400° C., where it begins to decompose. SBR latexes on the other hand have a manufacturer's temperature recommendation of around 82° C. to about 100° C.

Additional increases in performance of the polymer cement described here included an increase in compression strength. For example, a percent (%) increase in mechanical property (x) is calculated as [1−(x for control cement)/(x for polymer cement)]*100. An increase in compression strength demonstrates the beneficial effects from crosslinked aramide application. Referring now to FIG. 2, shown is a graph 20 comparing the respective compressive strengths of neat, polyamide, and latex cements. A series of data points 22, 23, 24 on graph 20 respectively reflect measured compressive strengths over time of a latex based cement, a polyamide based cement (made with the 1,6-diaminohexane monomer), and a neat cement. Samples of the cements were loaded over time, thus values of load in pounds-force ("lbf") are scaled along the ordinate 26 of graph 20, and values of time in seconds are scaled along the abscissa 28 of graph 20. A maximum compression strength of 25,667 lbf was measured for the latex based cements. Whereas the polyamide cement samples prepared in accordance with the present disclosure were tested and measured to have a maximum compression strength of over 34,167 lbf. The maximum compression strength of the neat cement approached 38,000 lbf.

Figure 3B:
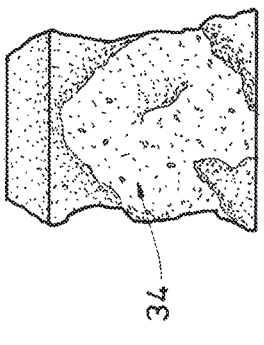
Figure 3C:
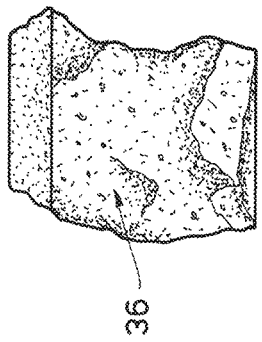

FIGS. 3A-3C illustrate different cement blocks that underwent the compressive testing illustrated in FIG. 2. Shown in perspective view in FIG. 3A is an example of a sample 30 formed from cement made having an amount of polyamide, such as one or more of Polymers A-E discussed above. While the compressive testing formed a crack 32 in sample 30, the sample 30 otherwise remained substantially intact. FIG. 3B shows in a perspective view an example of a sample 34 made from a latex-cement, and FIG. 3C is a perspective view of a sample 36 made from neat cement and having no additives. Samples 34, 36 were each subjected to compressive loading, but instead of remaining substantially intact like the sample 30 of FIG. 3A, both samples 34, 36 crumbled. The latex-cement (or latex based cement) was made by adding about 3% by weight of latex to cement. Neat cement was made by mixing cement, water, and an anti-foaming agent.

FIG. 4 is a graph 38 of data obtained by measuring the compression strength of cement samples, while loading the cement samples at loading rates of 27 lbf/s, 267 lbf/s, and 865 lbf/s. The cement samples included samples having the polyamides made in accordance with Equations 1-4 above, a neat cement, and a latex based cement. Data points 40, 42, 44, 46, 48, and 50 are shown on the graph 38. The ordinate 52 of graph 38 is scaled to reflect compression strength in one thousand pounds per square inch and the abscissa 54 is scaled to the loading rate (lbf/s). Data point 40, represents the measured compression strength of the cement having the polyamide of Equation 1 above. Data point 42, represents the measured compression strength of the cement having the polyamide of Equation 2 above; data point 44, represents the measured compression strength of the cement having the polyamide of Equation 3 above; and data point 46, represents the measured compression strength of the cement having the polyamide of Equation 4 above. Data points 48, 50 reflect measured compression strength respectively of a neat cement and latex based cement. The neat cement and latex based cement that were tested were made in the same way as the neat cement and latex based cement tested and illustrated in FIGS. 3B and 3C.

As shown in FIG. 4, data point 40, which is a single data point, shows a loading rate of 287 lbf/s and a compression strength of around 4500 psi. Data points 42 reflect compression strengths of around 3500 psi at a loading rate of 27 lbf/s, and a compression strength of around 5600 for a loading rate of 287 lbf/s. Line $L_{42}$ is shown connecting the two data points 42. Data points 44 reflect compression strengths of around 3700 psi at a loading rate of 27 lbf/s, and a compression strength of around 5800 for a loading rate of 287 lbf/s. Line $L_{44}$ is shown connecting the two data points 44. Data point 46, which is also a single data point, shows a loading rate of 27 lbf/s with a corresponding compression strength of around 3700 psi. Data points 48 reflect compression strengths of around 4000 psi at a loading rate of 27 lbf/s, and a compression strength of around 6700 for a loading rate of 865 lbf/s. Line $L_{48}$ is shown connecting the two data points 48. Data points 50 reflect compression strengths of around 4500 psi at a loading rate of 27 lbf/s, and a compression strength of around 4800 for a loading rate of 287 lbf/s. Line $L_{50}$ is shown connecting the two data points 50. The cement samples having the polyamide of Equations 2 and 3 and having latex were not tested at the loading rate of 865 lbf/s, but how these samples would perform at that loading rate was estimated by extrapolating lines $L_{42}$, $L_{44}$, and $L_{50}$. The sample having the polyamide of Equation 1 was tested at a loading rate of 287 lb/s, and the sample having the polyamide of Equation 4 was tested at a loading rate of 27 lbf/s; as these produced single data points, no corresponding lines were formed. From FIG. 4 though it is clear that cement samples having polyamides have greater compression strengths at higher loading rates.

In a non-limiting example, static measurements and dynamic measurements were conducted on samples of neat cement, cement having latex, and on cement having some of the aramides of Examples 1-6 above. Static measurements were performed using a press (the NER Autolab 3000), which can obtain pressures up to 10,000 psi. The test equipment included an axial loading system, a confining pressure supply system, and data acquisition software. The samples measured were cylinders having a two inch diameter and a four inch length, and were jacketed and placed between steel end caps. Linear variable differential transformers (LVDTs) included with the press measured axial and radial deformation of the sample. The static measurements were taken at ambient temperature and a pressure of about 3,000 psi. The sample was placed in a triaxial cell and pressurized to a confining pressure of 30 MPa. Each cement sample was subjected to three axial load cycles. Plots of the loading cycles over time resemble triangular waveforms. In each loading series, an axially applied differential stress of 10 MPa was applied, and various peak axial stresses were applied. By applying uniaxial stress to the sample, its Young's modulus and Poisson's ratio were calculated based on strain measured by the LVDTs. Differences in failure mechanisms were identified for the different cement samples tested.

Dynamic measurements of the cement samples were performed with a Chandler MPRO instrument under confined conditions. The measurements were obtained at temperatures ranging from about 180° F. to about 350° F., and at a pressure of 3,000 psi. The samples remained in the instrument after curing, and measurements were taken as the cement was setting. Here, incremental increases in temperature after 20 hours measured cement response to thermal changes and the effects on different mechanical properties.

Tables 1A-1C below contains ranges of values of compression strength in psi, Young's modulus in psi, and Poisson's ratio for the samples of cement containing aramide, samples of neat cement, and samples of latex cement.

TABLE 1A (Aramide Cement)

| | Compression Strength (psi) | Young's modulus (psi) | Poisson's Ratio |
|---|---|---|---|
| Static | 3000-5000 | $1.7 \times 10^6$-$2.2 \times 10^6$ | 0.23-0.33 |
| Dynamic | Variable | $1.6 \times 10^6$-$1.9 \times 10^6$ | 0.35-0.37 |

TABLE 1B (Neat)

| | Compression Strength (psi) | Young's modulus (psi) | Poisson's Ratio |
|---|---|---|---|
| Static | 5000-6500 | $2.0 \times 10^6$ | 0.2 |
| Dynamic | Variable | $1.4 \times 10^6$-$1.9 \times 10^6$ | 0.35-0.36 |

TABLE 1C (Latex Cement)

| | Compression Strength (psi) | Young's modulus (psi) | Poisson's Ratio |
|---|---|---|---|
| Static | 3000-5000 | $1.6 \times 10^6$-$1.9 \times 10^6$ | 0.25-0.35 |
| Dynamic | Variable | $1.4 \times 10^6$-$1.9 \times 10^6$ | 0.35-0.36 |

Figure 5A:
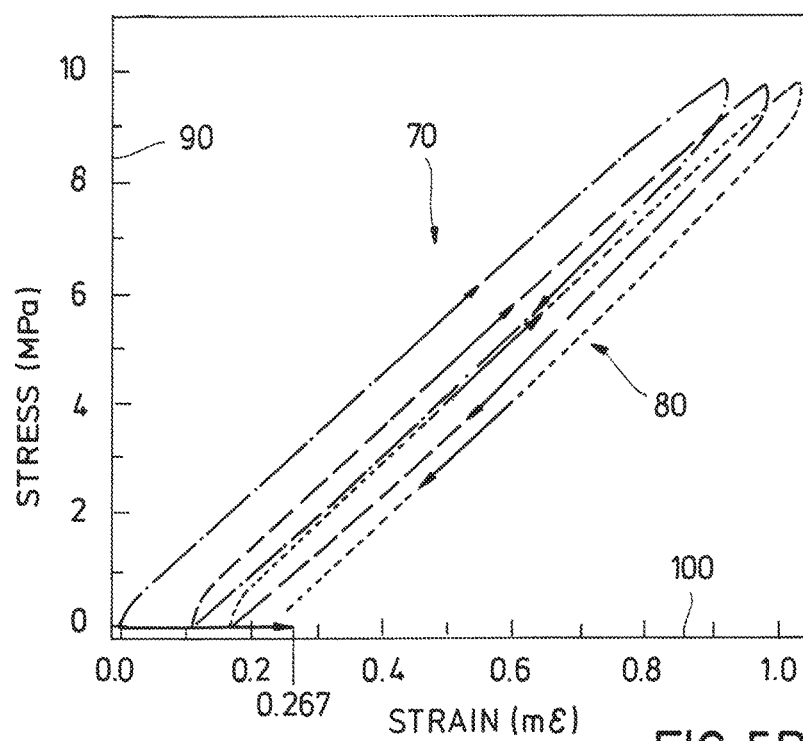
FIGS. 5A-5E are graphical illustrations of stress—strain data obtained by repeated loading of cement samples.
Figure 5B:
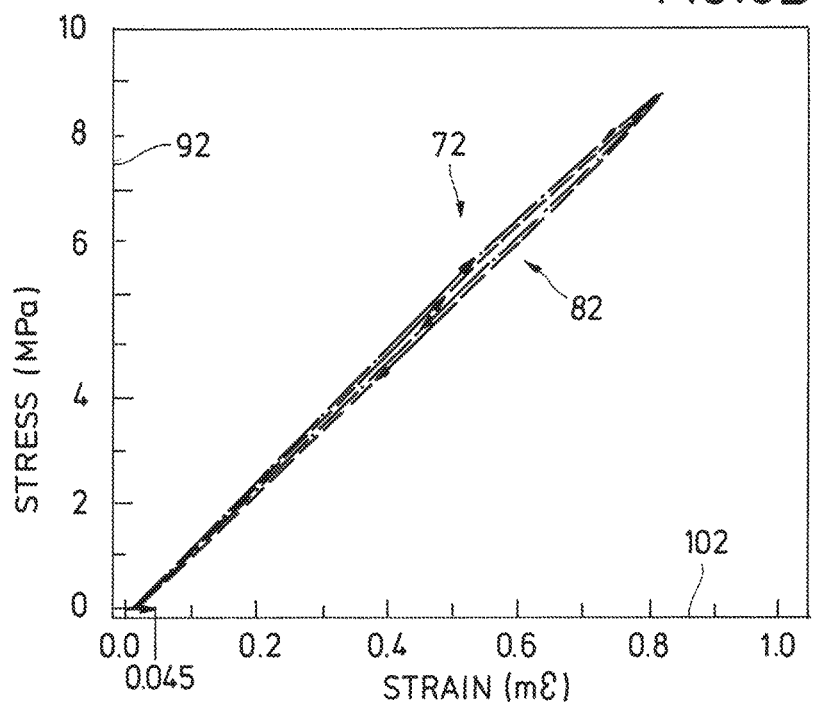
Figure 5C:
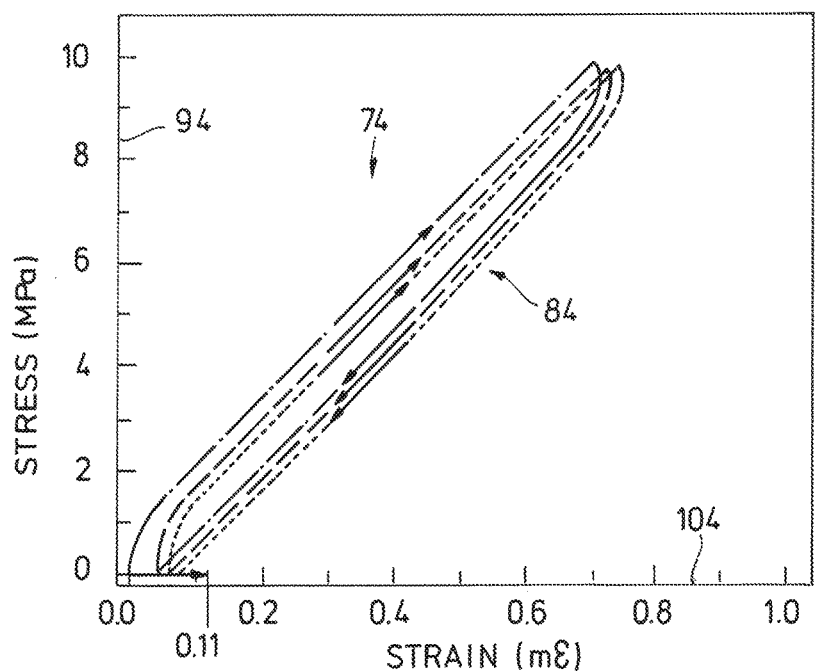
Figure 5D:
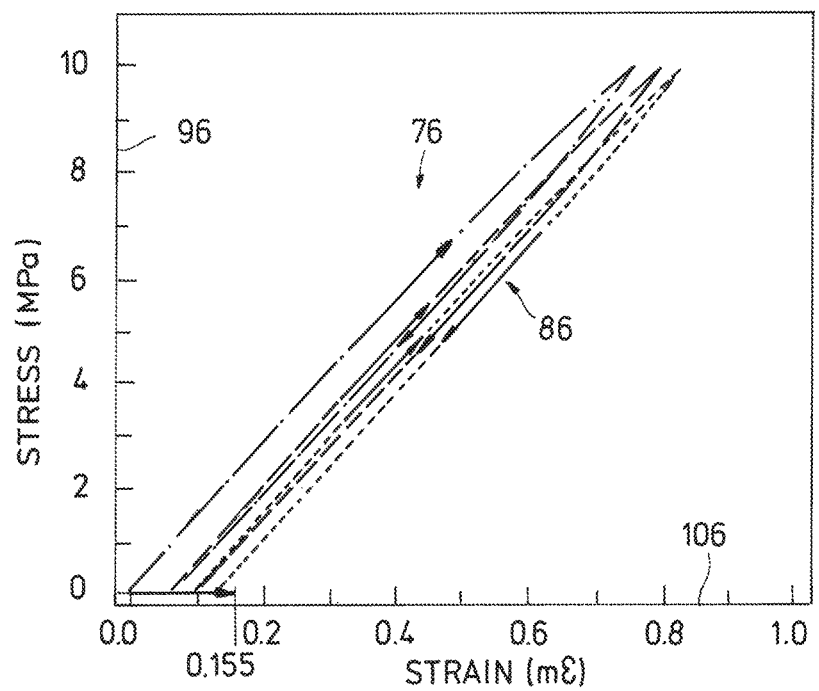
Figure 5E:
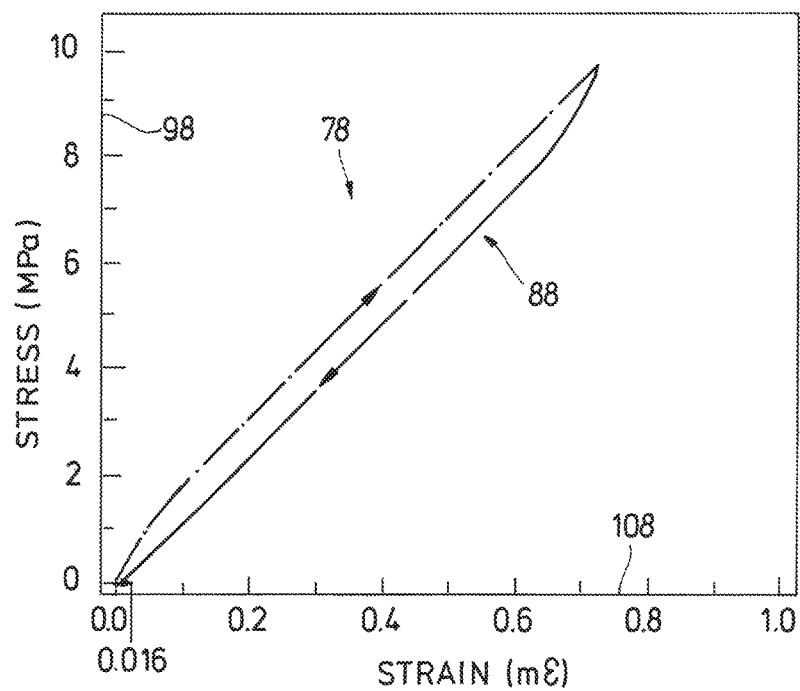

Graphs 70, 72, 74, 76, 78 are shown respectively in FIGS. 5A-5E that reflect applied stresses and thermal cycle responses of cements having the following respective additives: latex, Polymer D, Polymer B, Polymer C, and a 1:1 combination of Polymers D and B ("the tested cements"). Plots 80, 82, 84, 86, 88 are respectively illustrated on the graphs 70, 72, 74, 76, 78 that depict measured values of strain resulting from stressing these cements. Ordinates 90, 92, 94, 96, 98 on the graphs 70, 72, 74, 76, 78 are scaled to illustrate values of stress in MPa, and abscissas 100, 102, 104, 106, 108 on the graphs 70, 72, 74, 76, 78 are scaled to represent values of strain in millistrain (mE). The graphs 70, 72, 74, 76, 78 were generated using data obtained from a series of laboratory tests that cyclically loaded the tested cements, while at the same time triaxially compressing the tested cements. The resulting stresses experienced by the tested cements were recorded and compared to the applied stresses to examine fatigue behavior of the tested cements. Each of the tested cements experienced some degree of hysteresis, that is, the stress-strain relationship of the tested cements followed different paths under subsequent loading cycles. This is best seen in FIG. 5A, where cement sample being tested contains latex. Here as illustrated by plot 80, the latex cement sample experienced a permanent strain of 26.7% after the three loading cycles. As shown in FIGS. 5B-5E, tested cements containing the polymers experienced deformations that were significantly lower than that of the latex cement of FIG. 5A, and which were unexpected. More specifically, the cement sample containing Polymer D experienced a 4.5% permanent strain (FIG. 5B), the cement sample containing Polymer B experienced an 11% permanent strain, the cement sample containing Polymer C experienced a 15.5% permanent strain, and the cement sample containing a blend of Polymers B and D experienced a 1.6% permanent strain. Not to be confined to theory, but it is believed that the intermolecular interaction between the polymeric structure and the cement surface is strong due to the reactive amide group.

Provided in FIG. 6A is a graph 110 containing plots 112, 114, 116, 118, 120, 122 that represent compression strength of various cements. Data obtained for plots 112, 114, 116, 118, 120, and 122 was respectively obtained by testing samples of neat cement, cement containing Polymer C, cement containing latex, cement containing Polymer B, cement containing Polymer D, and cement containing Polymer E. Units of the compression strength is in thousands of pounds per square inch (kpsi), and as reflected in FIG. 6A, the compression strength measurements were taken over a length of time and a range of temperatures. Values of compression strength are plotted along a left hand ordinate 124, values of temperature are plotted along a right hand ordinate 126, and values of time are plotted along abscissa 128. As illustrated in FIG. 6A, the temperature was 180° F. for 0 to about 70 hours, at 240° F. from about 70 hours to about 90 hours, at 300° F. from about 90 hours to about 115 hours, and 350° F. from about 115 hours to about 130 hours. The subsequent changes in temperature took place over a relatively short period of time and were generally instantaneous. As shown in the Example of FIG. 6A, compression strengths of every cement sample tested dropped at a substantial rate at each temperature increase. At temperatures equal to or greater than 240° F. the samples demonstrated a general reduction in magnitude over time, even when exposed to constant temperature. As illustrated by plot 114, the cement sample containing Polymer C possessed a compression strength having the largest magnitude at temperatures of 300° F. and greater, including neat cements and that having latex.

Figure 6B:
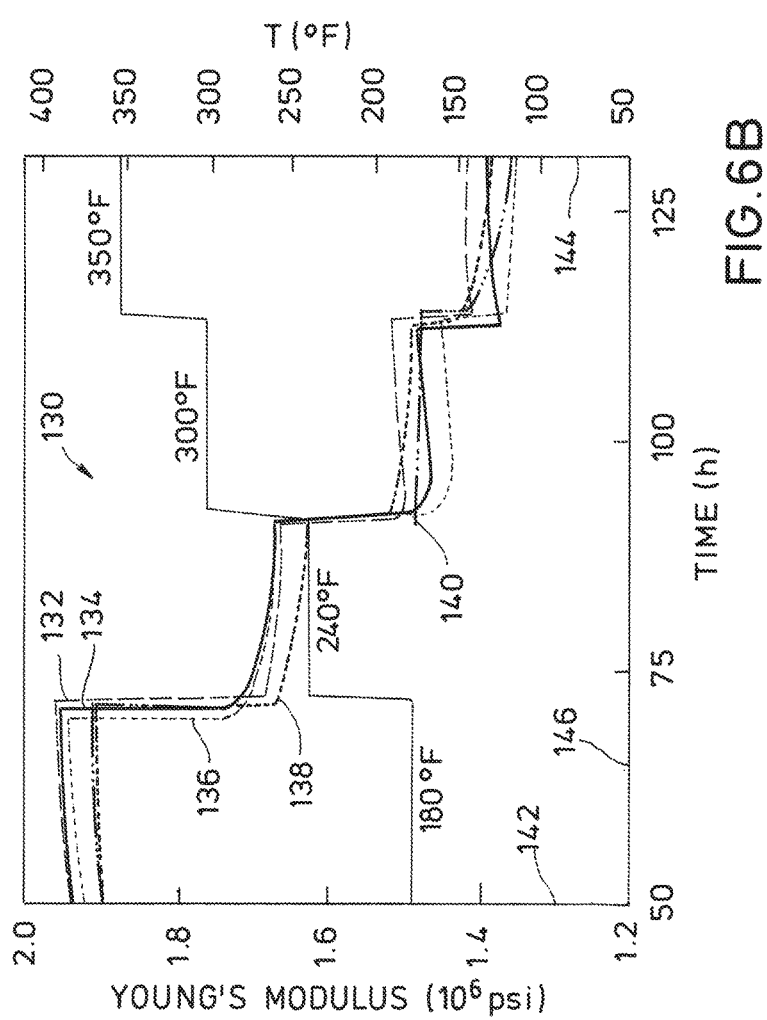

A graph 130 is shown in FIG. 6B having plots 132, 134, 136, 138, 140 that represent measured values of Young's modulus ($\times 10^6$ psi) of samples respectively made up of cement having Polymer C, neat cement, cement having latex, cement having Polymer B, and cement having Polymer D. Values of Young's modulus are plotted along a left hand ordinate 142, values of temperature are plotted along a right hand ordinate 144, and values of time are plotted along abscissa 144. The values of temperature and respective durations used to generate the plots 132, 234, 136, 138, 140 of FIG. 6B were substantially the same as that used to generate the data for FIG. 6A. Similar to the results of FIG. 6A, the measured Young's modulus of the cement samples experienced a significant rate of decrease with each increase in temperature. Further illustrated in FIG. 6B is that the measured Young's modulus for the sample having Polymer C (plot 132) was greater than that of the samples having neat cement (plot 134) and cement with latex (plot 136). Further values obtained for Polymer C that are over the varying ranges of temperatures, include values of transit and shear velocity times. Transit velocity values ranged between 7 and 8 microseconds per inch for temperatures of 180° F. to 350° F., and which generally increased with increasing temperature. Shear velocity times ranged from about 15 to about 18 microseconds per inch for temperatures of 180° F. to 350° F. Shear velocity values also increased with increasing temperature.

In one non-limiting example of use, combining the reactants to form the polyamide generates an emulsion of a dispersed phase and a continuous phase; where the diamines are contained in the dispersed phase, and the triacid chloride is in the continuous phase. Vesicles are formed by interfacial polymerization along interfaces between the dispersed and continuous phase, and are made up at least in part by the polyamide. Due to additional processing, or compression within the cement, the vesicles are ruptured to form spent capsules. Thus in an embodiment, at least some of the polyamide in the cement is in the form of spent capsules, which are generally non-spherical, and range in shape from a planar configuration, to those with a cross section that approximates an ellipse. In an alternative, the polyamide spent capsules have distinct shapes that dynamically expand and contract, such as by osmosis. In an embodiment, the vesicles are emulsion templated, where the dispersed and continuous phase fluids yield the shape of the polyamide at the interface. Other possible shapes of the polyamide include hollowed fibers.

Figure 7:
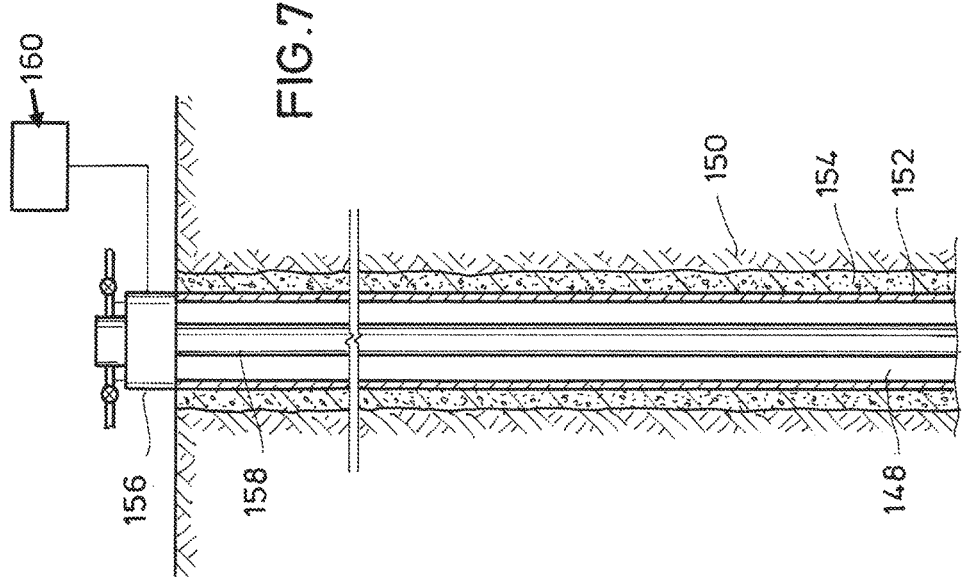
FIG. 7 is a side partial sectional view of an example of a wellbore having cement made in accordance with the present disclosure.

Referring now to FIG. 7, shown in a side partial sectional view is an example of a wellbore 148 intersecting a formation 150. Casing 152 lines the wellbore 148, and where cement 154 is disposed in an annular space between the casing 152 and wall of the wellbore 148. In an example, the cement 154 includes a polyamide, and can further include a polyamide made in accordance with the present disclosure, such as one or more of Polymers A-E and their combinations. A wellhead assembly 156 is shown mounted at an opening of the wellbore 148 and which contains pressure in the wellbore 148, as well as controlling flow from and into the wellbore 148. Production tubing 158 is shown deployed within the casing 152 and inside of which connate fluid produced from the formation 150 can be delivered to the wellhead assembly 156. An optional controller 160 is shown on surface and which is used to monitor downhole conditions in the wellbore 148, and that can convey signals downhole for operating production equipment (not shown), such as valves and packers.

In one example, crosslinking the aramide yields particles that are linear and particles that are three-dimensional. Thus crosslinking enhances the base polymer and forms a polymer network. Benefits of forming an aromatic compound include the advantages of rigidity and strength. Also, the alkane long chain of the 1,6-hexane diamine provides polymer flexibility. Another advantage of the polymer products described here include, the electron displacement between the amine, carbonyl and aromatic group, which yields an increase in binding between the polymer and the cement, and in turn enhances chemical interaction of the polymer to the cement. It has also been found to be advantageous to use different polymer moieties when forming the polyamide cement which increases ductility of cement and offers the potential for chemical interactions with cement and physical blocking by the polymer. In an example, physical blocking occurs when the polymers are insoluble they become particles embedded in the cement that serve as a physical barrier. These advantages provide a way to create a cement polymer with mechanical properties to prolong the lifespan of wellbore cement sheaths, thereby preventing cement casing annulus pressure problems Example 12

A number of samples of aramide capsules were formed according to the methods described. The continuous solvent was a 4:1 cyclohexane-chloroform blend. The surfactant was a 1.5% by volume sorbitan trioleate (Span-85®, Sigma-Aldrich®, St. Louis, Mo.). The continuous phase included the continuous solvent and the surfactant. The crosslinker was 1,3,5-benzenetricarbonyl trichloride. The dispersed solvent was water. The dispersed monomer was 1,6-diaminohexane. The cement additive was the dispersant sulfonated acetone-formaldehyde condensate (SAFC). The dispersed phase included the dispersed solvent, the dispersed monomer, and the cement additive. SAFC has a red color, and so acted as a dye or a signaling molecule in Example 12. The SAFC allowed measurements to be taken of the release rate from the capsules.

The aramide capsules were prepared at room temperature. 25 ml of the continuous phase was added to 3 ml of the dispersed phase. The mixture was stirred for 15 minutes forming a w/o emulsion. After 15 minutes of stirring the crosslinker was added to the mixture in an amount in milliMolars (mM) according to Table 2. For each sample, the crosslinker was added at a rate of about 1.5 ml per minute. Stirring continued while the crosslinker was being added. Stirring maintained the w/o emulsion.

TABLE 2

| Sample | Amount of Crosslinker (mM) |
| --- | --- |
| A | 23 |
| B | 46 |
| C | 77 |
| D | 154 |

After 20 minutes, polymerization was stopped by filtering the solid aramide capsules. The aramide capsules were washed with 500 ml of a sodium bicarbonate buffer solution (1% weight per volume (w/v), pH ~8.3). The washed aramide capsules were vacuum dried.

Figure 8:
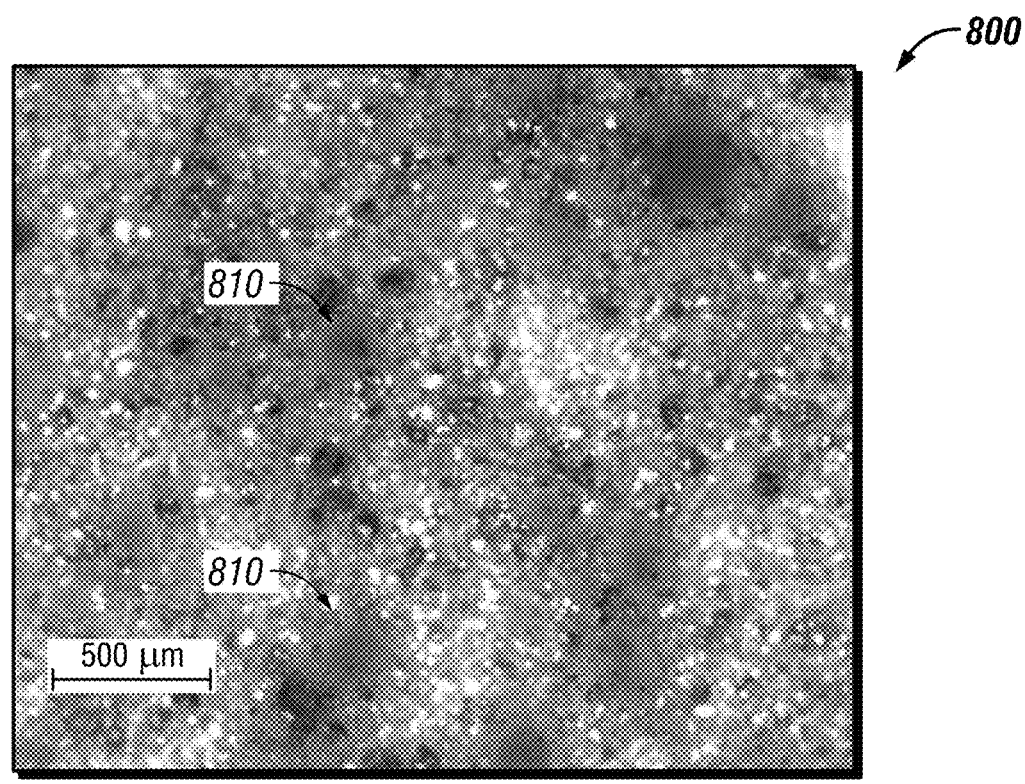
FIG. 8 is a photographic representation of the aramide capsules embedded in a cement slurry, as imaged by optical microscopy at ambient conditions.

The aramide capsules were placed onto a microscope slide and placed under an optical microscope with a mounted digital camera and a power source. FIG. 8 shows an optical micrograph image 800 of the aramide capsules 810 containing the SAFC encapsulant.

Example 13

Polymerization of each sample formed in Example 12 was stopped at predetermined intervals by filtering the solid aramide capsules. Each aramide capsule sample was subjected to a multi-wash process. Each sample was washed with diethyl ether then washed with 500 ml of a sodium bicarbonate buffer solution (1% w/v, pH ~8.3).

UV/Vis spectrophotometry was employed to obtain absorbance curves of SAFC for each sample. Each sample was introduced into a UV/Vis spectrophotometer ($\lambda_{max}$=420 nm, from Hach, Loveland, Colo.) to measure absorbance. Calibration was performed by taking 1 ml calibration samples of each sample. After settling for a few hours, the calibration samples were filtered by using a 0.45 µm nylon syringe filter. The filtered calibration samples were introduced into the UV/Vis spectrophotometer to measure absorbance of free SAFC (that is, SAFC that is not contained in the aramide capsules) in solution. The absorbance spectrum of each sample was calibrated with the absorbance spectrum of the corresponding free SAFC calibration sample.

Figure 9:
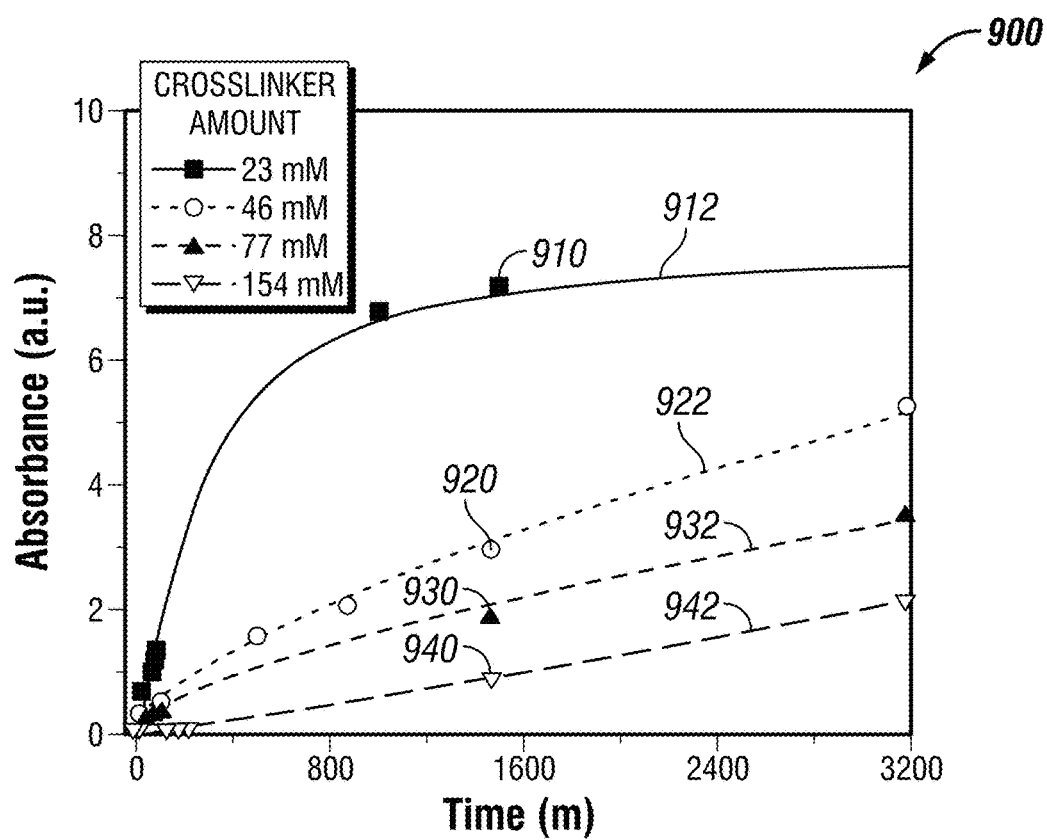
FIG. 9 is a graphical representation showing ultraviolet/visible (UV/Vis) absorbance of the encapsulant released from the aramide capsule samples over time.

The results were shown in FIG. 9. FIG. 9 is a graphical representation 900 showing UV/Vis absorbance of the encapsulant released from the aramide capsules over time. The horizontal axis represents time in minutes. The vertical axis represents UV/Vis absorbance in arbitrary units. Square points 910 and the corresponding regression curve 912 represent absorbance of Sample A in Example 12 having 23 mM of crosslinker. Circular points 920 and the corresponding regression curve 922 represent absorbance of Sample B in Example 12 having 46 mM of crosslinker. Triangular points 930 and the corresponding regression curve 932 represent absorbance of Sample C in Example 12 having 77 mM of crosslinker. Reverse-triangular points 940 and the corresponding regression curve 942 represent absorbance of Sample D in Example 12 having 154 mM of crosslinker.

FIG. 9 shows that the amount of dye that diffused into the supernatant was inversely dependent on the amount of the crosslinker. FIG. 9 also shows that the permeability, and as a result the release rate of the encapsulant, can be controlled by the amount of crosslinker added to the mixture. An increase in the concentration of the crosslinker resulted in a decrease in membrane permeability.

Example 14

An aramide capsule was formed according to the methods described. The continuous solvent was a 4:1 cyclohexane-chloroform blend. The surfactant was a 1.5% by volume sorbitan trioleate (Span-85®, Sigma-Aldrich®, St. Louis, Mo.). The continuous phase included the continuous solvent and the surfactant. The crosslinker was 1,3,5-benzenetricarbonyl trichloride. The dispersed solvent was water. The dispersed monomer was 1,6-diaminohexane. The encapsulant was polyethylenimine (PEI). The dispersed phase included the dispersed solvent, the dispersed monomer, and the encapsulant.

The aramide capsules were prepared at room temperature. 25 ml of the continuous phase was added to 3 ml of the dispersed phase. The mixture was stirred for 15 minutes forming a w/o emulsion. After 15 minutes of stirring 40 ml of the crosslinker (0.02 M solution) was added to the mixture. For each sample, the crosslinker was added at a rate of about 1.5 ml per minute. Stirring continued while the crosslinker was being added. Stirring maintained the w/o emulsion.

After 30 minutes, polymerization was stopped by filtering the solid aramide capsules. The aramide capsules were washed with 500 ml of a sodium bicarbonate buffer solution (1% w/v, pH ~8.3). The washed aramide capsules were vacuum dried in an oven.

Figure 10:
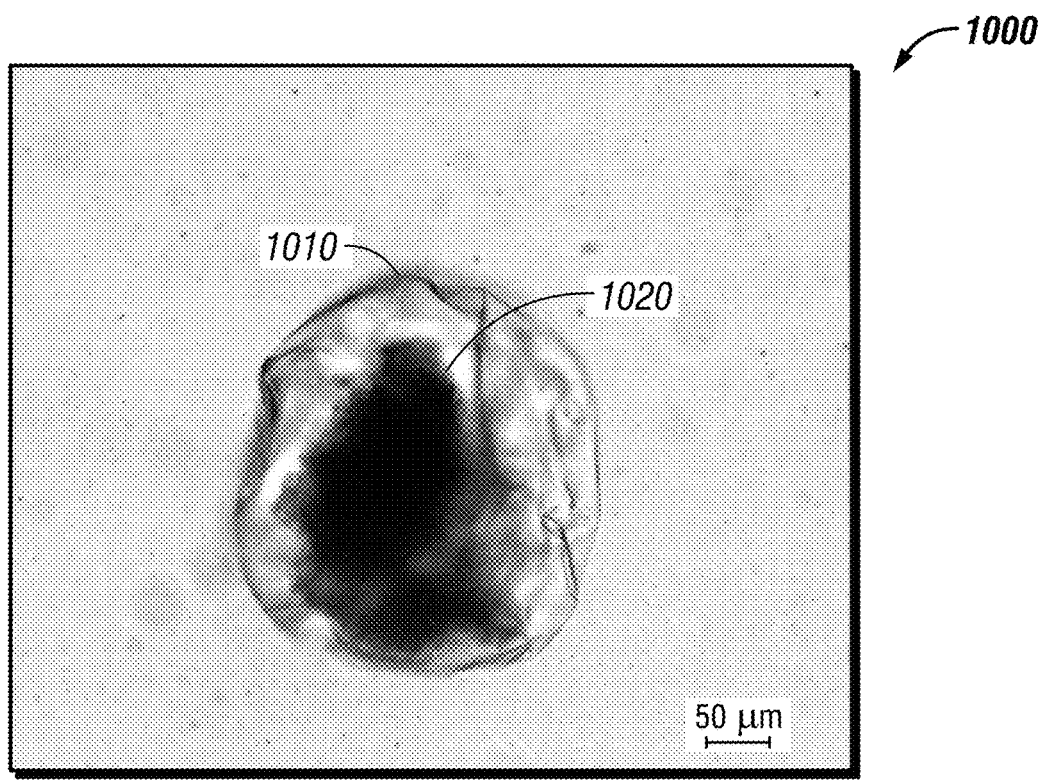
FIG. 10 is a photographic representation of the aramide capsule, as imaged by optical microscopy at ambient conditions.

The aramide capsules were placed onto a microscope slide and placed under an optical microscope with a mounted digital camera and a power source. FIG. 10 shows an optical micrograph image 1000 of the aramide capsule 1010 containing the PEI encapsulant 1020.

Example 15

A number of samples of aramide capsules were formed according to the methods described. The continuous solvent was a 4:1 cyclohexane-chloroform blend. The surfactant was a 1.5% by volume sorbitan trioleate (Span-85®, Sigma-Aldrich®, St. Louis, Mo.). The continuous phase included the continuous solvent and the surfactant. The crosslinker was 1,3,5-benzenetricarbonyl trichloride. The dispersed solvent was water. The dispersed monomer was 1,6-diaminohexane. The cement additive was the dispersant SAFC condensate. The dispersed phase included the dispersed solvent, the dispersed monomer, and the cement additive. SAFC has a red color, and so acted as a dye or a signaling molecule. The SAFC allowed measurements to be taken of the release rate from the aramide capsules.

The aramide capsules were prepared at room temperature. 25 ml of the continuous phase was added to 3 ml of the dispersed phase. The dispersed phase included 130 mM of the dispersed monomer. The dispersed phase included 0.5% bwoc of the SAFC encapsulant. The mixture was stirred for 15 minutes forming a w/o emulsion. After 15 minutes of stirring, the crosslinker in an amount in mM according to Table 3 was added to the mixture at a rate of about 1.5 ml per minute. Stirring continued while the crosslinker was being added. Stirring maintained the w/o emulsion.

TABLE 3

| Sample | Amount of Crosslinker (mM) | Amount of Dispersed Monomer (mM) | Amount of SAFC Encapsulant (% bwoc) |
|--------|---------------------------|----------------------------------|--------------------------------------|
| E | 16 | 130 | 0.5 |
| F | 50 | 130 | 0.5 |
| G | 65 | 130 | 0.5 |
| H | 82 | 130 | 0.5 |

Polymerization was stopped at a predetermined interval of about 24 hours where the w/o emulsion was filtered to produce the solid aramide capsules. The aramide capsules were washed with 500 ml of a borate buffer solution. The washed aramide capsules were vacuum dried producing a free flowing powder.

A cement slurry was formed having water, cement, and 3% bwoc of the aramide capsules. Any type of cement can be used in the cement slurry, including all Portland cements, any type of cement as classified by the American Society for Testing and Materials (ASTM), such as Type I, II, III, or V, and any type of cement as classified by the American Petroleum Institute (API), such as Class A, C, G, or H. Portland cements are described in API specification for "Materials and Testing for Well Cements," API 10B-2 of the API. Following API standards the slurry was blended at 4,000 rpm for 15 s and then increased to 12,000 rpm for 35 s. The slurry was placed in a rheometer (Anton Paar GmbH, Graz, Austria) to measure changes in viscosity over time.

Figure 11:
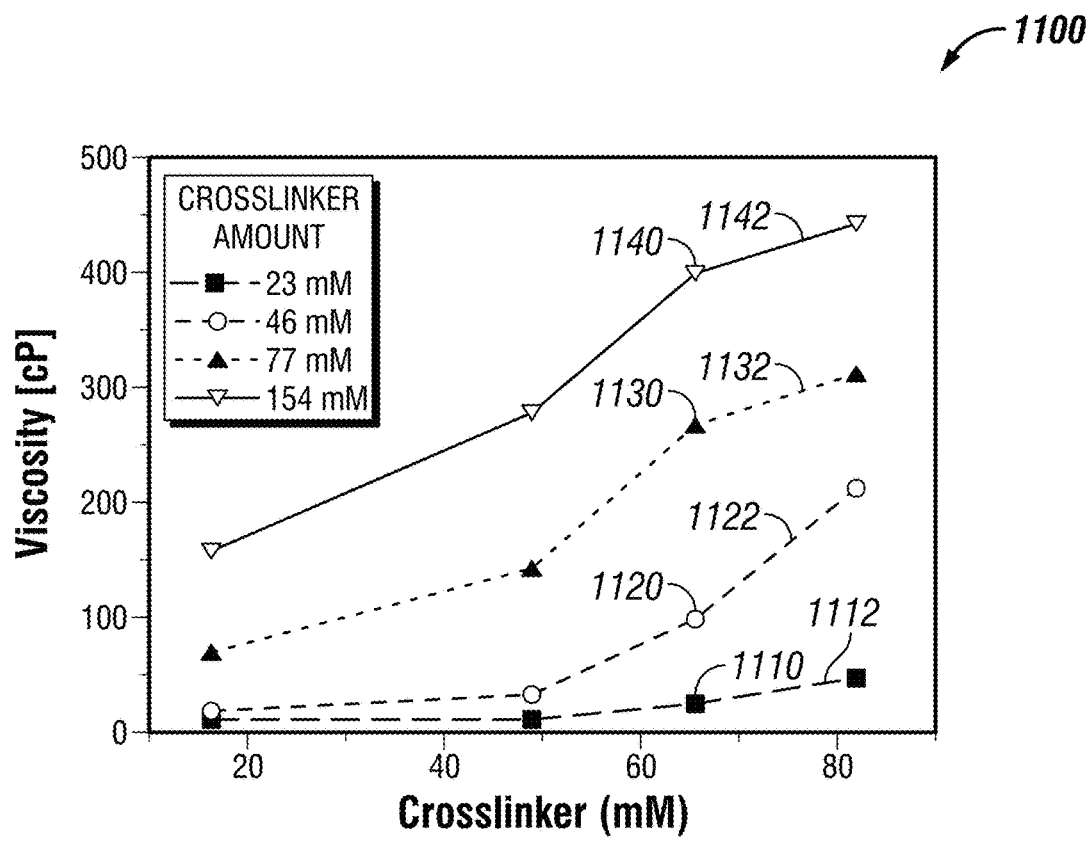
FIG. 11 is a graphical representation showing viscosity of the cement slurry having the encapsulant within the aramide capsule samples of varying monomer concentration.

The results were shown in FIG. 11. FIG. 11 is a graphical representation 1100 showing viscosity of the cement slurry having the encapsulant within the aramide capsule samples of varying monomer concentration. The horizontal axis represents concentration of the crosslinker in mM. The vertical axis represents viscosity of the cement slurry in centipoise (cP). Square points 1110 and the corresponding lines 1112 represent viscosities of cement slurries having Samples E-G collected at 0 minutes of mixing the slurry. Circular points 1120 and the corresponding lines 1122 represent viscosities of cement slurries having Samples E-G collected at 10 minutes of mixing the slurry. Triangular points 1130 and the corresponding lines 1132 represent viscosities of cement slurries having Samples E-G collected at 20 minutes of mixing the slurry. Reverse-triangular points 1140 and the corresponding lines 1142 represent viscosities of cement slurries having Samples E-G collected at 30 minutes of mixing the slurry.

FIG. 11 shows that the viscosity of the cement slurry was dependent on the amount of the crosslinker. FIG. 11 also shows that the permeability, and as a result the release rate of the encapsulant, can be controlled by the amount of the crosslinker added to the mixture. An increase in the concentration of the crosslinker resulted in a decrease in membrane permeability.

Example 16

A number of samples of aramide capsules were formed according to the methods described. The continuous solvent was a 4:1 cyclohexane-chloroform blend. The surfactant was a 1.5% by volume sorbitan trioleate (Span-85®, Sigma-Aldrich®, St. Louis, Mo.). The continuous phase included the continuous solvent and the surfactant. The crosslinker was 1,3,5-benzenetricarbonyl trichloride. The dispersed solvent was water. The dispersed monomer was 1,6-diaminohexane. The cement additive was the dispersant SAFC. The dispersed phase included the dispersed solvent, the dispersed monomer, and the cement additive. SAFC has a red color, and so acted as a dye or a signaling molecule. The SAFC allowed measurements to be taken of the release rate from the aramide capsules.

The aramide capsules were prepared at room temperature. The dispersed phase included the dispersed monomer in an amount in mM according to Table 4. The dispersed phase included 0.5% bwoc of the SAFC encapsulant. The mixture was stirred for 15 minutes forming a w/o emulsion. After 15 minutes of stirring, the crosslinker in an amount in mM according to Table 4 was added to the mixture at a rate of about 1.5 ml per minute. Stirring continued while the crosslinker was being added. Stirring maintained the w/o emulsion.

TABLE 4

| Sample | Amount of Crosslinker (mM) | Amount of Dispersed Monomer (mM) | Amount of SAFC Encapsulant (% bwoc) |
|---|---|---|---|
| I (free dispersant, no capsules in cement) | 0 | 0 | 0.5 |
| J | 20 | 130 | 0.5 |
| K | 50 | 130 | 0.5 |
| L | 80 | 130 | 0.5 |

Polymerization was stopped at a predetermined interval of about 24 hours where the w/o emulsion was filtered to produce the solid aramide capsules. The aramide capsules were washed with 500 ml of a diethyl ether and borate buffer solution. The washed aramide capsules were vacuum dried.

A cement slurry was formed having water, cement, and 3% bwoc of the aramide capsules. In addition to the cement slurries having aramide capsules, a neat cement slurry was also formed having water and cement. Any type of cement can be used in the cement slurry, including all Portland cements, any type of cement as classified by ASTM, such as Type I, II, III, or V, and any type of cement as classified by API, such as Class A, C, G, or H. Portland cements are described in API specification for "Materials and Testing for Well Cements," API 10B-2 of the API. Following API standards the slurry was blended at 4,000 rpm for 15 s and then increased to 12,000 rpm for 35 s. The slurry was placed in a rheometer (Anton Paar GmbH, Graz, Austria) to measure changes in viscosity over time.

Figure 12:
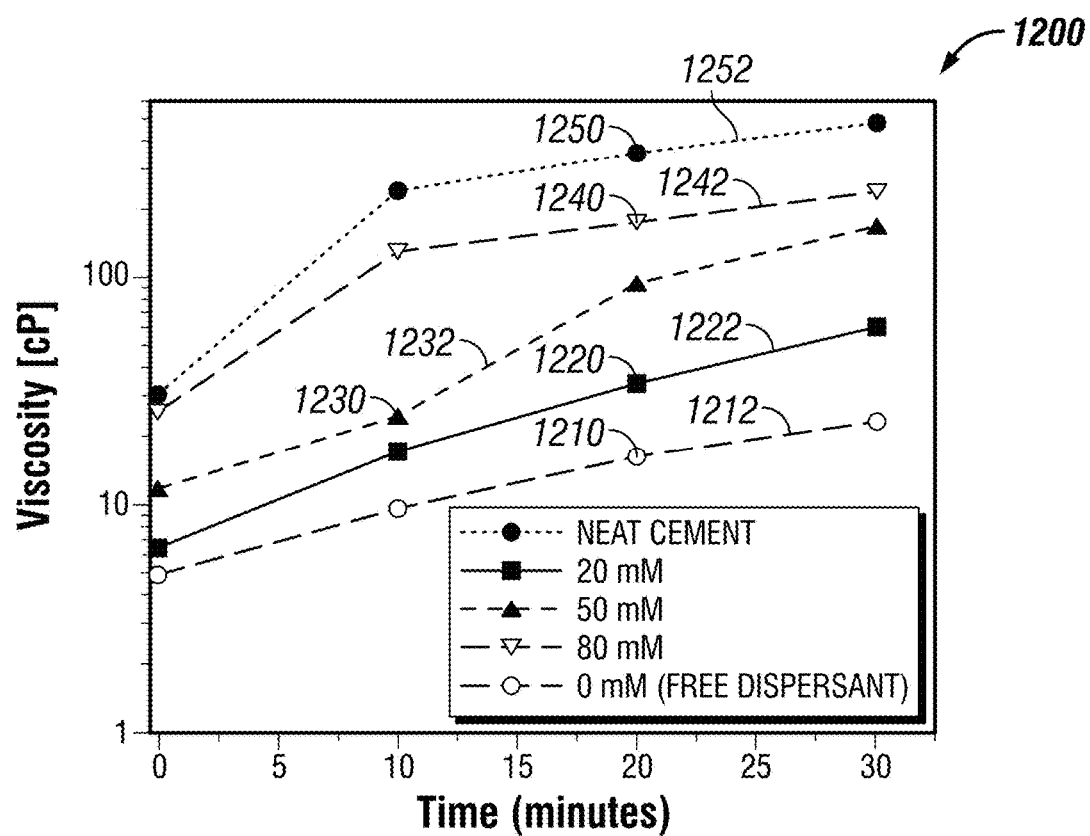
FIG. 12 is a graphical representation showing viscosity of the cement slurry having aramide capsule samples over time.

The results are shown in FIG. 12. FIG. 12 is a graphical representation 1200 showing viscosity of the cement slurry having aramide capsule samples over time. The horizontal axis represents time in minutes. The vertical axis represents viscosity of the cement slurry in cP. Empty circular points 1210 and the corresponding lines 1212 represent viscosities of the cement slurry having Sample I over time. Square points 1220 and the corresponding lines 1222 represent viscosities of the cement slurry having Sample J over time. Triangular points 1230 and the corresponding lines 1232 represent viscosities of the cement slurry having Sample K over time. Reverse-triangular points 1240 and the corresponding lines 1242 represent viscosities of the cement slurry having Sample L over time. Filled circular points 1250 and the corresponding lines 1252 represent viscosities of the neat cement slurry over time.

FIG. 12 shows that the viscosity of the cement slurry was dependent on the amount of the crosslinker. FIG. 12 also shows that the permeability, and as a result the release rate of the encapsulant, can be controlled by the amount of the crosliner added to the mixture. An increase in the concentration of the crosslinker resulted in a decrease in membrane permeability.

Example 17

A capsule-based cement having aramide capsules was prepared. Example aramide capsules include aramide capsules formed in Examples 12-16. A cement slurry was formed having water, cement, and 3% bwoc of the aramide capsules. Any type of cement can be used in the cement slurry, including all Portland cements, any type of cement as classified by ASTM, such as Type I, II, III, or V, and any type of cement as classified by API, such as Class A, C, G, or H. Portland cements are described in API specification for "Materials and Testing for Well Cements," API 10B-2 of the API. Following API standards the slurry was blended at 4,000 rpm for 15 s and then increased to 12,000 rpm for 35 s.

A neat cement was prepared. A cement slurry was formed having water and cement. Any type of cement can be used in the cement slurry, including all Portland cements, any type of cement as classified by ASTM, such as Type I, II, III, or V, and any type of cement as classified by API, such as Class A, C, G, or H. Portland cements are described in API specification for "Materials and Testing for Well Cements," API 10B-2 of the API. The slurry was blended at 4,000 rpm for 15 s, and blended at 12,000 rpm for 35 s.

A latex-based cement was prepared. A cement slurry was formed having water, cement, 6% bwoc of a 50% latex solution, and 15% by weight of the latex solution a stabilizer. Any type of cement can be used in the cement slurry, including all Portland cements, any type of cement as classified by ASTM, such as Type I, II, III, or V, and any type of cement as classified by API, such as Class A, C, G, or H. Portland cements are described in API specification for "Materials and Testing for Well Cements," API 10B-2 of the API. Example latexes include carboxylated latexes and carboxylated styrene-butadiene latexes. The slurry was blended at 1,000 rpm for 35 s.

After mixing, each slurry was poured into a sample holder of an ultrasonic cement analyzer (UCA, from Chandler Engineering, Broken Arrow, Okla.) for measuring confined compression strength. The UCA is suitable for curing cement slurries and conducting in situ testing of cements at wellbore conditions. Each slurry was then placed into a curing chamber to start the measurement, where the cement remained for a period of about 72 hours to about 120 hours at about 350° F. and about 3,000 psi.

Figure 13:
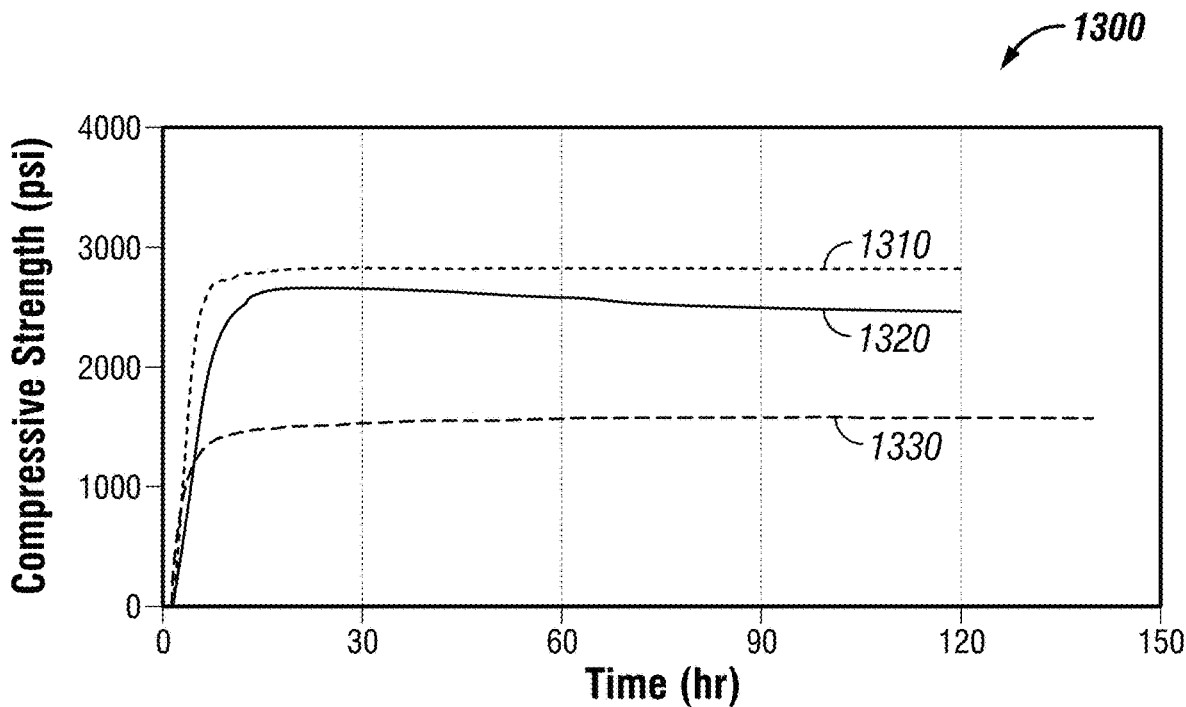
FIG. 13 is a graphical representation showing unconfined compression strengths of cement samples.

The results are shown in FIG. 13. FIG. 13 shows a graphical representation 1300 of unconfined compression strengths of cement samples formed in Example 17. Graphical representations 1310, 1320, 1330 correspond to the unconfined compression strengths of the neat cement, the aramide capsule-based cement, and the latex-based cement, respectively. The vertical axis represents the unconfined compression strength in psi. The horizontal axis represents time in hours. As shown in FIG. 13, the neat cement exhibits an unconfined compression strength ranging from about 3,500 psi to about 3,600 psi, at about 350° F. for about 120 hours. The capsule-based cement exhibits an unconfined compression strength ranging from about 3,000 psi to about 3,400 psi, at about 350° F. for about 120 hours. The latex-based cement exhibits an unconfined compression strength ranging from about 1,900 psi to about 2,200 psi, at about 350° F. for about 120 hours.

FIG. 13 shows that cement strength retrogression occurs significantly for the latex-based cements compared to neat cement at wellbore conditions. On the other hand, cement strength retrogression does not significantly occur for the capsule-based cement, showing that the aramide capsules and the cement additives within the capsules provide structural integrity to the cement.

Example 18

A number of samples of aramide capsules were formed according to the methods described. The continuous solvent was a 4:1 cyclohexane-chloroform blend. The surfactant was sorbitan trioleate (Span-85®, Sigma-Aldrich®, St. Louis, Mo.). The continuous phase included the continuous solvent and 1% by volume of the surfactant. The crosslinker was 1,3,5-benzenetricarbonyl trichloride. The dispersed solvent was water. The dispersed monomer for System A (similar to Polymer C of Example 4) was 1,4-diaminobenzene. The dispersed monomer for System B (similar to Polymer B of Example 3) was 1,3-diaminobenzene. The dispersed monomer for System C (similar to Polymer D of Example 5) was 1,6-diaminohexane. The dispersed phase included the dispersed solvent and the dispersed monomer. The molar ratio of the dispersed monomer and the crosslinker was 3:2.

The aramide capsules were prepared at room temperature. 16.2 grams of the dispersed monomer was added to 200 ml of water to produce the dispersed phase. 26.5 grams of the crosslinker was added to 200 ml of the continuous solvent to produce a crosslinker solution. The dispersed phase was combined with 750 ml of the continuous phase. The mixture was stirred for about 15 minutes at about 1000 rpm (without turbulent mixing) forming a w/o emulsion. After 15 minutes of stirring the crosslinker solution was added to the mixture at a rate of about 1 ml per minute until the molar ratio of the dispersed monomer and the crosslinker reached 3:2. Stirring continued while the crosslinker solution was being added. Stirring continued for an additional 24 hours, maintaining the w/o emulsion.

Stirring was stopped and the solid aramide capsules were filtered. The aramide capsules were washed with 500 ml of a sodium bicarbonate buffer solution (1% weight per volume (w/v), pH ~8.3). The aramide capsules were filtered once more and were spread over a flat surface to dry in a vacuum oven at 85° C. overnight, until no change in weight was observed. The resulting aramide capsules were in the form of a free flowing powder.

Example 19

Figure 14A:
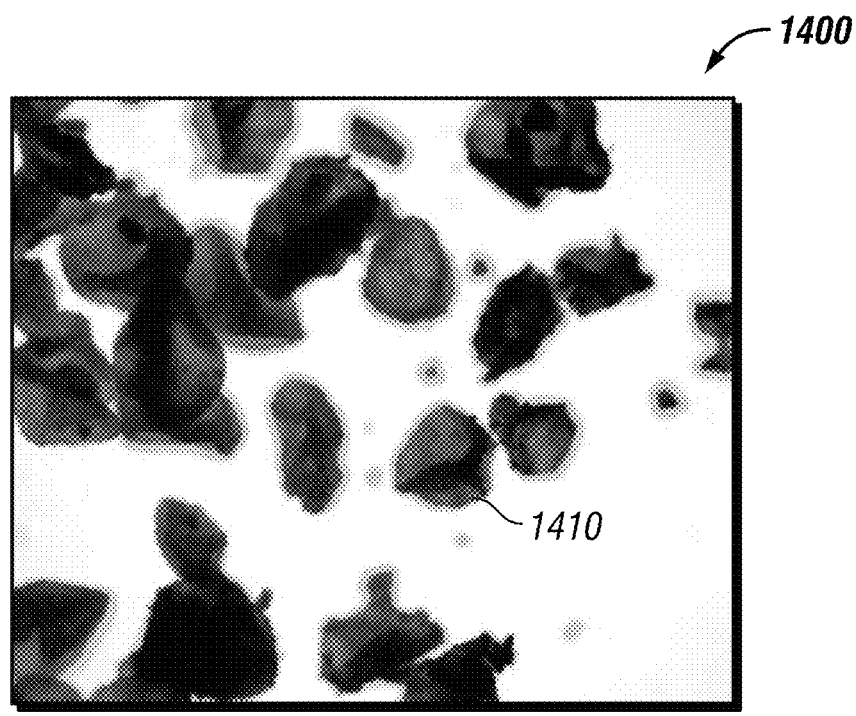
FIG. 14A is a photographic representation of the aramide capsules, as imaged by optical microscopy at ambient conditions.

In one setup, the dried aramide capsules obtained in Example 18 were placed onto a microscope slide and placed under an optical microscope with a mounted digital camera and a power source. FIG. 14A shows an optical micrograph image 1400 at 5× magnification of the dried aramide capsules 1410, showing certain degrees of crenation or wrinkling. The dried aramide capsules 1410 had a hollow structure.

Figure 14B:
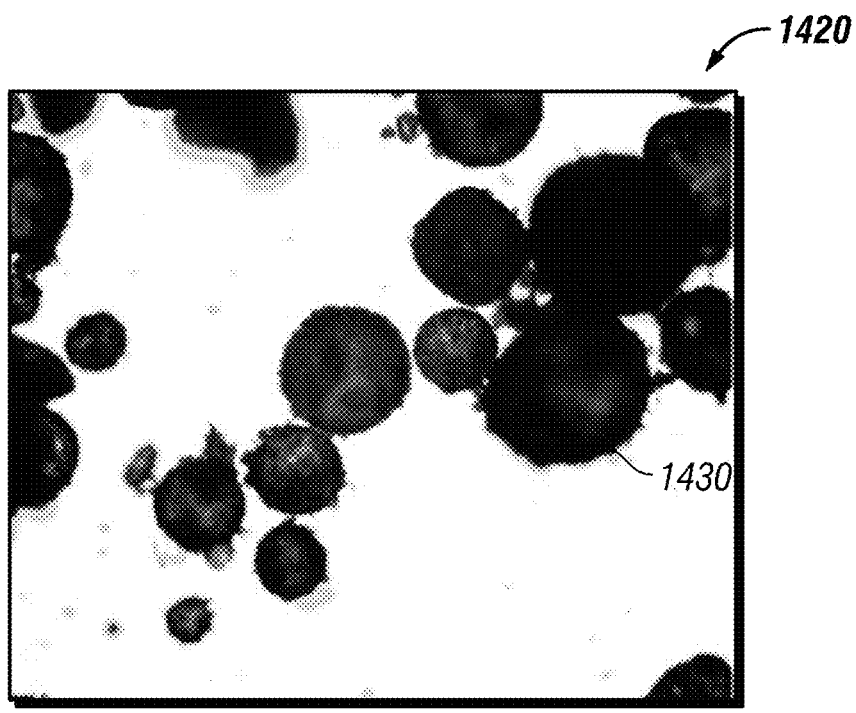
FIG. 14B is a photographic representation of the aramide capsules, as imaged by optical microscopy at ambient conditions.

In another setup, the dried aramide capsules obtained in Example 18 were suspended in water and were allowed to expand. The expanded aramide capsules were placed onto a microscope slide and placed under an optical microscope with a mounted digital camera and a power source. FIG. 14B shows an optical micrograph image 1420 of the expanded aramide capsules 1430. The dynamic expanding motion of the aramide capsules were observed in real time.

As shown in FIGS. 14A and 14B, the aramide capsules underwent multiple cycles of expansion and contraction. When placed in a hypotonic solution, the aramide capsules maintained the expanded form having a substantially spherical shape. When in dried form or placed in a hypertonic solution, the aramide capsules maintained the contracted form having a crenated or wrinkled shape. The aramide capsules were robust enough to survive multiple cycles of swelling and collapsing without being ruptured.

Figure 14C:
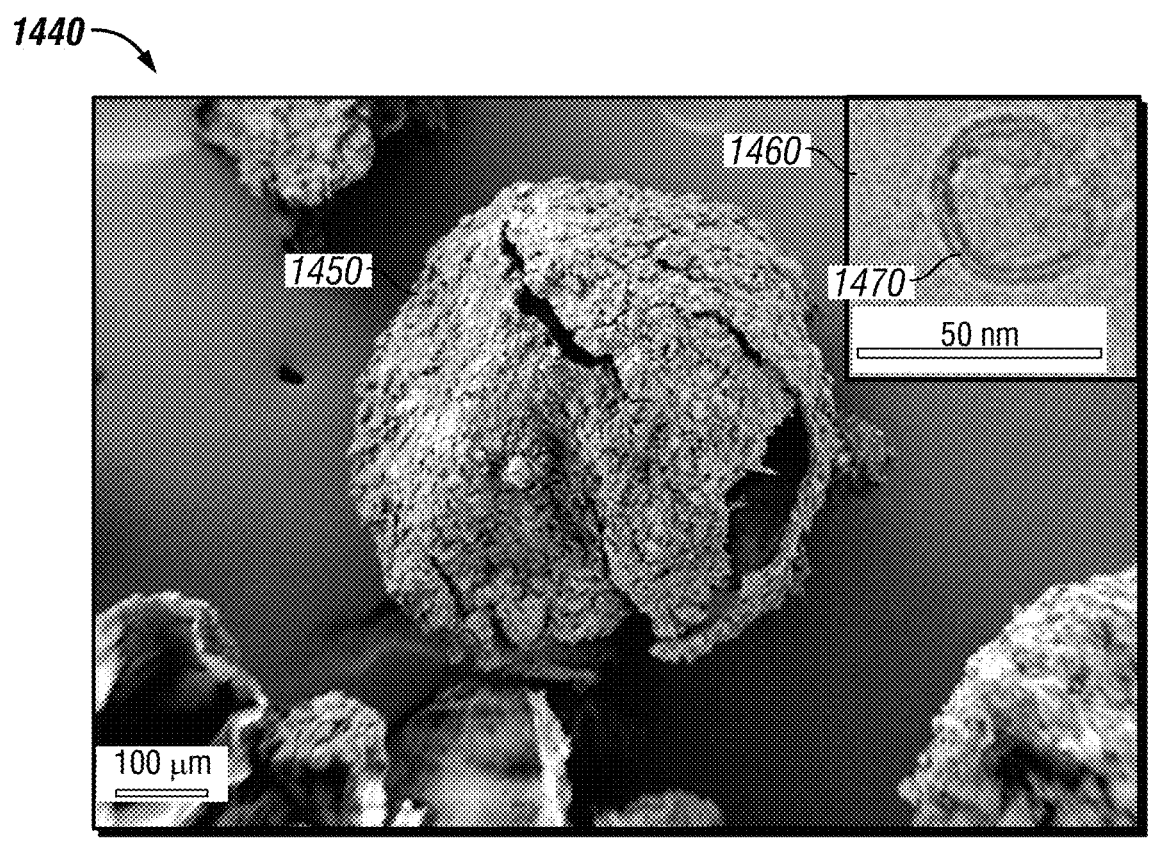
FIG. 14C is a photographic representation of the aramide capsules, as imaged by scanning electron microscopy. The insert of FIG. 14C is a photographic representation of the aramide capsule, as imaged by transmission electron microscopy.

Yet in another setup, the dried aramide capsules obtained in Example 18 were observed via scanning electron microscopy (SEM) and transmission electron microscopy (TEM). FIG. 14C shows an SEM image 1440 of a ruptured aramide capsule 1450. The insert of FIG. 14C shows a TEM image 1460 of a ruptured aramide capsule 1470. A ruptured aramide capsule was selected to determine the wall thickness. In one experiment, the aramide capsule has a diameter of about 120 µm and a wall thickness of about 4 µm. As shown in the SEM image 1440 and the TEM image 1460, the aramide capsules are formed in various sizes depending on the homogeneity of the w/o emulsion. Without being bound by any theory, a homogeneous emulsion has a relatively low opacity and would form similarly sized aramide capsules whereas a less homogenous emulsion has a relatively greater opacity and would form variously sized aramide capsules.

Example 20

Figure 15A:
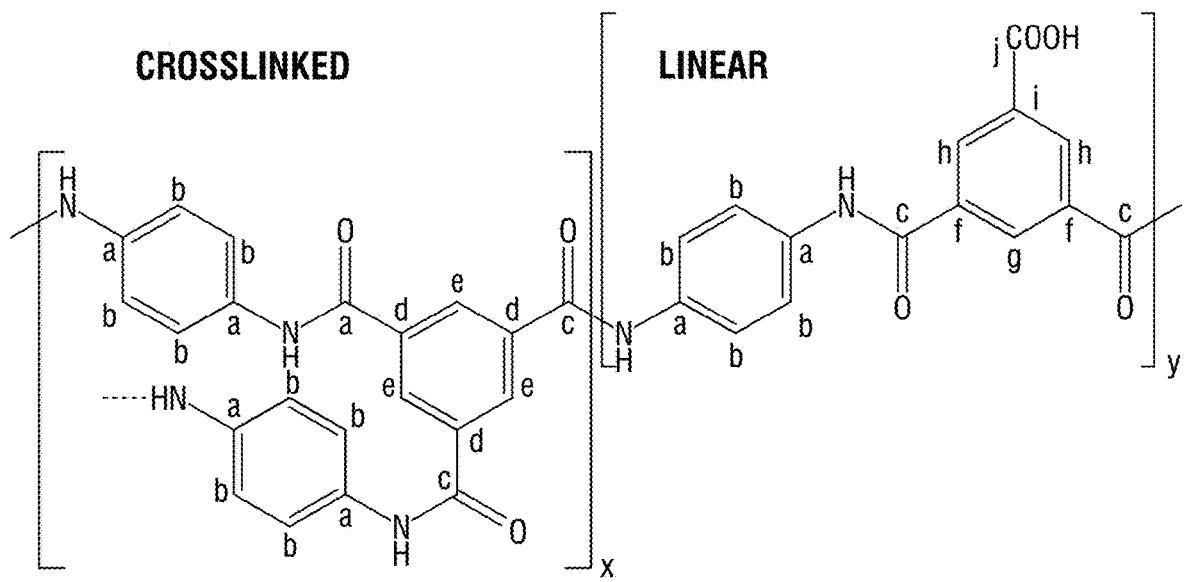
FIG. 15A is a schematic representation of the chemical structure of an aramide capsule.
Figure 15B:
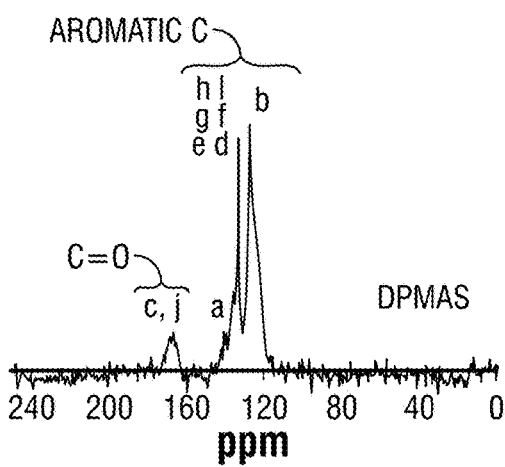
FIG. 15B is a graphical representation showing a solid state cross polarization magic angle spinning nuclear magnetic resonance spectrum of an aramide capsule.
Figure 15C:
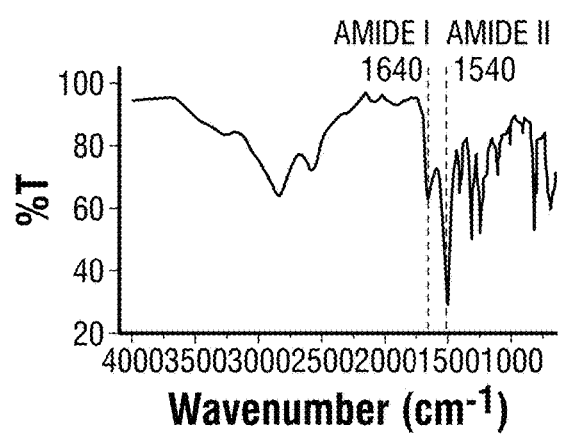
FIG. 15C is a graphical representation showing a Fourier-transform infrared spectrum of an aramide capsule.
Figure 16A:
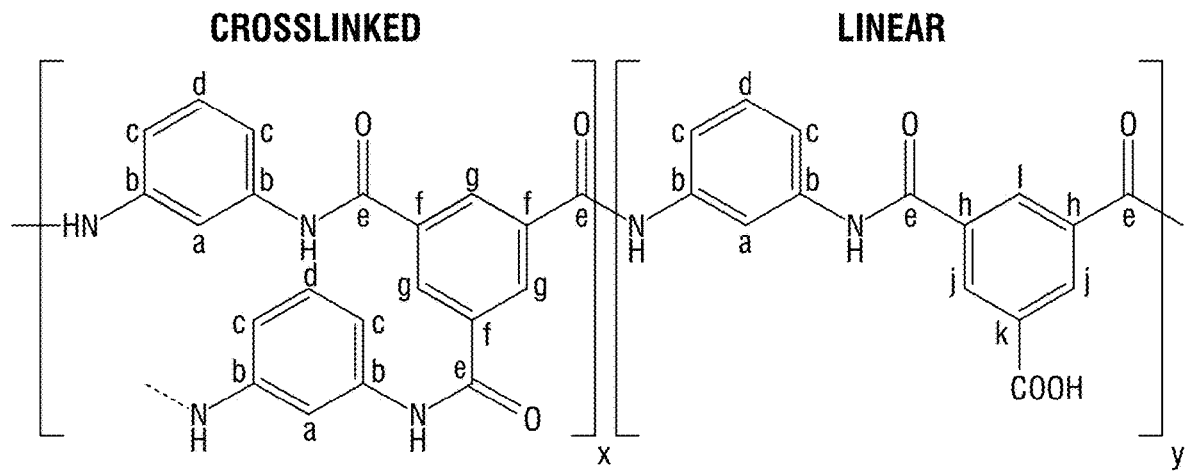
FIG. 16A is a schematic representation of the chemical structure of an aramide capsule.
Figure 16B:
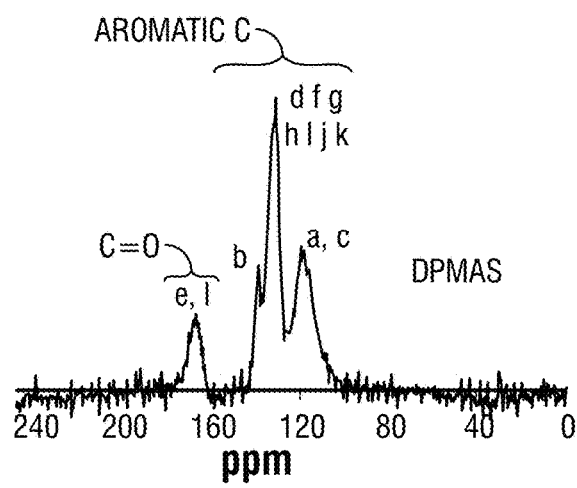
FIG. 16B is a graphical representation showing a solid state cross polarization magic angle spinning nuclear magnetic resonance spectrum of an aramide capsule.
Figure 16C:
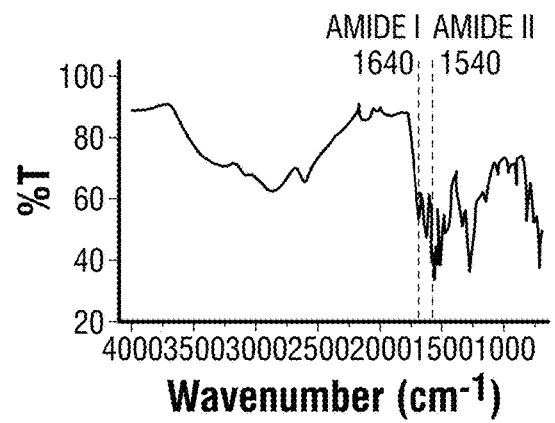
FIG. 16C is a graphical representation showing a Fourier-transform infrared spectrum of an aramide capsule.
Figure 17A:
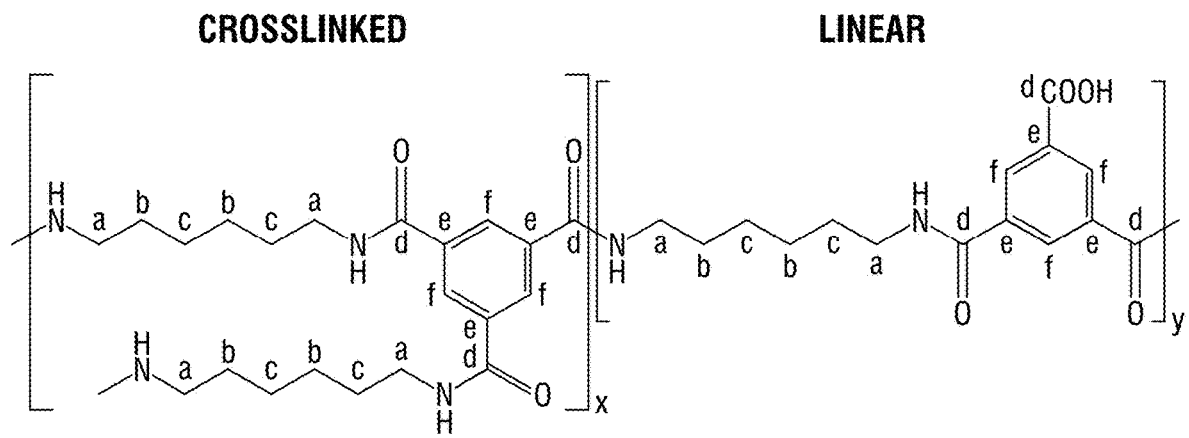
FIG. 17A is a schematic representation of the chemical structure of an aramide capsule.
Figure 17B:
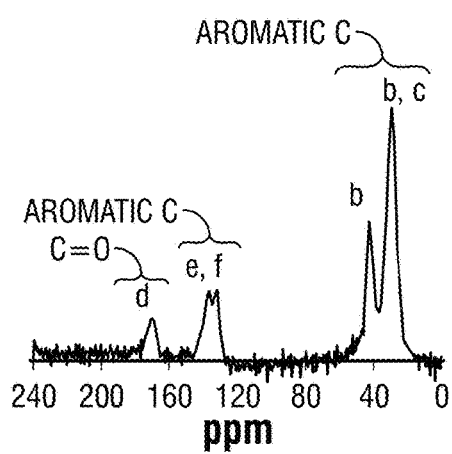
FIG. 17B is a graphical representation showing a solid state cross polarization magic angle spinning nuclear magnetic resonance spectrum of an aramide capsule.
Figure 17C:
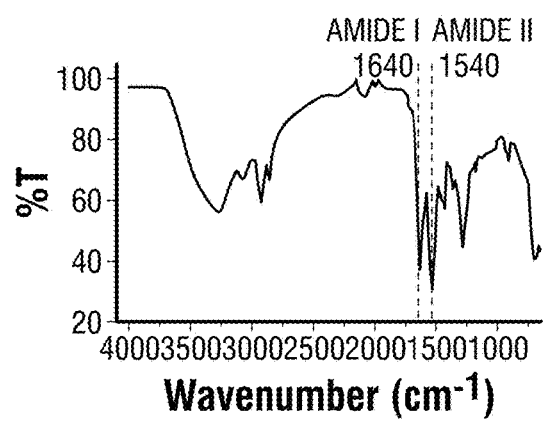
FIG. 17C is a graphical representation showing a Fourier-transform infrared spectrum of an aramide capsule.

Studies were conducted to determine the degree of aromaticity versus aliphaticity of the aramide capsules obtained in Example 18. In one setup, the aramide capsules obtained in Example 18 were subject to solid state cross polarization magic angle spinning (CPMAS) nuclear magnetic resonance (NMR) spectroscopy (Bruker Aeon™ 500 MHz spectrometer and TopSpin 3.2 software, Billerica, Mass.). In another setup, the aramide capsules obtained in Example 18 were subject to Fourier-transform infrared (FTIR) spectroscopy (Agilent Cary 630 FTIR spectrometer with MicroLab FTIR software, Santa Clara, Calif.). The results for System A are shown in FIGS. 15A-15C. The results for System B are shown in FIGS. 16A-16C. The results for System C are shown in FIGS. 17A-17C. The results show that Systems A and B have a greater degree of aromaticity and a lesser degree of aliphaticity than System C.

FIG. 15A is a schematic representation of the chemical structure of System A. As shown, System A includes a crosslinked section and a linear section. The lower case letters a-j represent carbon atoms located at different positions. FIG. 15B is a graphical representation of a CPMAS NMR spectrum obtained for System A. As shown, three peaks positioned between 100 ppm and 150 ppm represent the presence of aromatic carbon atoms and one peak positioned between 160 parts per million (ppm) and 180 ppm represent the presence of carbonyl carbon atoms. FIG. 15C is a graphical representation of an FTIR spectrum obtained for System A. As shown, infrared absorption is observed at 1,640 and 1,540 wavenumbers ($cm^{-1}$), both representing the presence of amide groups.

FIG. 16A is a schematic representation of the chemical structure of System B. As shown, System B includes a crosslinked section and a linear section. The lower case letters a-l represent carbon atoms located at different positions. FIG. 16B is a graphical representation of a CPMAS NMR spectrum obtained for System B. As shown, three peaks positioned between 100 ppm and 150 ppm represent the presence of aromatic carbon atoms and one peak positioned between 160 ppm and 180 ppm represent the presence of carbonyl carbon atoms. FIG. 16C is a graphical representation of an FTIR spectrum obtained for System B. As shown, infrared absorption is observed at 1,640 and 1,540 wavenumbers ($cm^{-1}$), both representing the presence of amide groups.

FIG. 17A is a schematic representation of the chemical structure of System C. As shown, System C includes a crosslinked section and a linear section. The lower case letters a-f represent carbon atoms located at different positions. FIG. 17B is a graphical representation of a CPMAS NMR spectrum obtained for System C. As shown, two peaks position between 20 ppm and 60 ppm represent the presence of aliphatic carbons, two peaks positioned between 100 ppm and 150 ppm represent the presence of aromatic carbon atoms, and one peak positioned between 160 ppm and 180 ppm represent the presence of carbonyl carbon atoms. FIG. 17C is a graphical representation of an FTIR spectrum obtained for System C. As shown, infrared absorption is observed at 1,640 and 1,540 wavenumbers (cm$^{-1}$), both representing the presence of amide groups.

Example 21

Studies were conducted to determine the solubility of the aramide capsules obtained in Example 18. It was determined that the aramide capsules were insoluble or minimally soluble in tetrahydrofuran, dichloromethane, chloroform, dimethylformamide, dimethyl sulfoxide, diethyl ether, toluene, hexane, N-methyl-2-pyrrolidone, acetone, and fuming hydrochloric acid. It was also determined that the aramide capsules were insoluble or minimally soluble in 50% cresol and 50% methylene chloride, 50% cresol and 50% chloroform, 30% trifluoroethanol and 70% methylene chloride, and 30% trifluoroethanol and 70% chloroform. Without being bound by any theory, the insolubility of the aramide capsules shows that the aramide capsules have a relatively highly crosslinked chemical structure than having a branched configuration or existing in the form of an ammonium salt.

Example 22

An aramide cement slurry was prepared by mixing 450 grams of Portland cement CEM I 52.5 N (Milke® classic from HeidelbergCement, Geseke, Germany) with 22.5 grams (5% bwoc) of the aramide capsules obtained from Example 18. Subsequently, 225 grams of water (water-to-cement weight ratio of 0.5) was placed in a porcelain cup, where the cement and aramide capsule mixture was added to the water over a period of about 1 minute. The mixture was rested for 1 minute and was subsequently stirred for 2 minutes to form the cement slurry. The cement slurry was poured fully into a Vicat cone (having a 40 millimeter (mm) height, a 70 mm top diameter, and an 80 mm bottom diameter) placed on a glass plate. A reference cement slurry was prepared using the same procedure but in the absence of the aramide capsules.

Figure 18A:
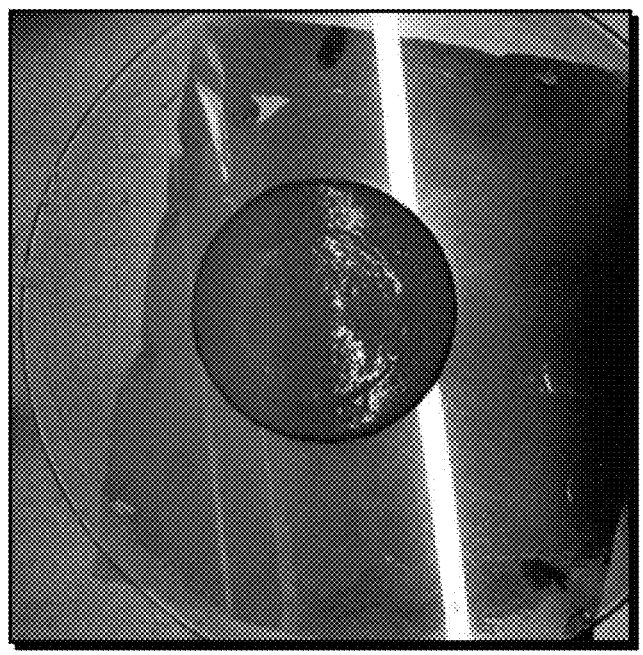
FIG. 18A is a photographic representation of a cement slurry.
Figure 18B:
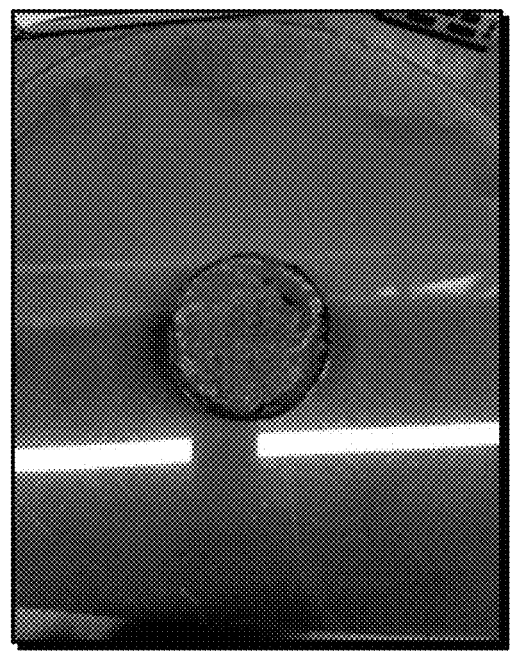
FIG. 18B is a photographic representation of a cement slurry.

Slump flow values for the aramide cement slurry and the reference cement slurry were determined by measuring the diameter of the slurries after vertically removing the Vicat cones. The results are shown in FIGS. 18A and 18B. FIG. 18A is a photographic representation showing the appearance of the reference cement slurry after the removal of the Vicat cone. The slump flow value of the reference cement slurry was about 15.7 centimeters (cm). FIG. 18B is a photographic representation showing the appearance of the aramide cement slurry after the removal of the Vicat cone. The slump flow value of the aramide cement slurry was about 9 cm. The results show that the aramide capsule can be used as a superabsorbent polymer enhancing the viscosity of the cement slurry.

Example 23

Mortar slurries were prepared according to the DIN EN 196 standard using a ToniMIX eccentric agitator (Toni Technik Baustoffprüfsysteme GmbH, Berlin, Germany). Mortar A included 450 grams of cement, 1,350 grams of CEN standard sand, and 270 grams of water (water-to-cement weight ratio of 0.6). Mortar Slurry A was used as a reference. Mortar B included 450 grams of cement, 1,350 grams of CEN standard sand, 22.5 grams (5% bwoc) of the aramide capsules obtained from Example 18, and 270 grams of water (water-to-cement ratio of 0.6). Mortar C included 450 grams of cement, 1,350 grams of CEN standard sand, 22.5 grams (5% bwoc) of the aramide capsules obtained from Example 18, 0.3 grams of a defoamer (Surfinol® MD-20, Air Products, Netherlands), and 270 grams of water (water-to-cement ratio of 0.6).

Figure 19A:
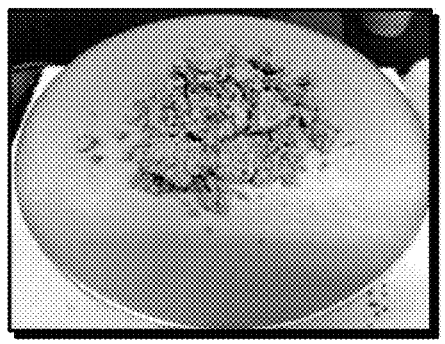
FIG. 19A is a photographic representation of a mortar slurry.
Figure 19B:
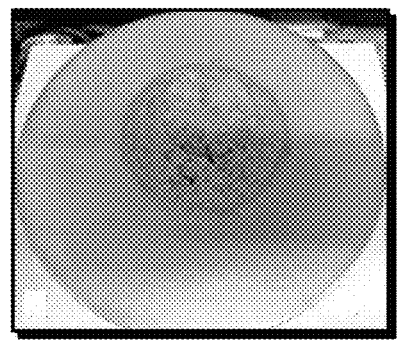
FIG. 19B is a photographic representation of a mortar slurry.
Figure 19C:
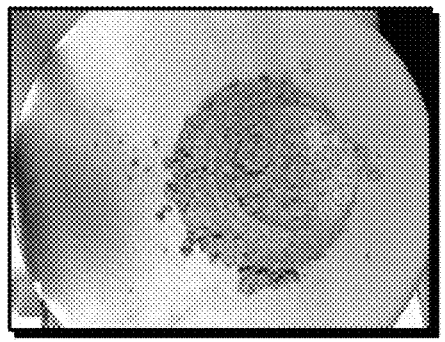
FIG. 19C is a photographic representation of a mortar slurry.
Figure 19D:
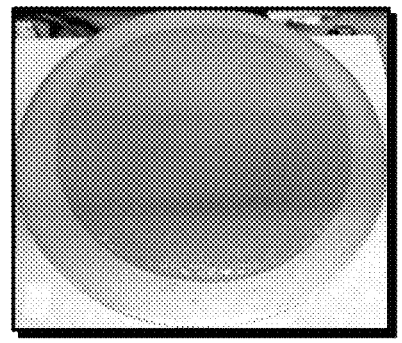
FIG. 19D is a photographic representation of a mortar slurry.

Slump flow values for the mortar slurries were determined using a Vicat cone procedure similar to Example 22. The results are shown in FIGS. 19A-19D. FIG. 19A is a photographic representation showing the appearance of a mortar slurry similar to Mortar B but having a water-to-cement ratio of 0.5. FIG. 19B is a photographic representation showing the appearance of Mortar B after the removal of the Vicat cone. The slump flow value of Mortar B was about 15.0 cm. FIG. 19C is a photographic representation showing the appearance of Mortar C after the removal of the Vicat cone. The slump flow value of Mortar C was about 13.4 cm. FIG. 19D is a photographic representation showing the appearance of Mortar A after the removal of the Vicat cone. The slump flow value of Mortar A was about 24.2 cm. The results show that the aramide capsule can be used as a superabsorbent polymer enhancing the viscosity of the mortar slurry.

Example 24

The mortar slurries obtained in Example 23 were poured into cube molds and subsequently hardened for about 28 days in a curing chamber at 99% relative humidity at 20° C. For comparison, a neat cement and an aramide cement slurry containing 3% bwoc of the aramide capsules were prepared and hardened in a similar manner. Mechanical properties such as density, unconfined compressive strength, and tensile strength of the hardened mortars were measured according to the BS 4550-3.4: 1978a standard (British Standards Institution). The results are shown in Table 5.

TABLE 5

| Sample | Density (kg/m$^3$) | Compressive Strength (MPa) | Tensile Strength (MPa) | Compressive to Tensile Ratio |
|---|---|---|---|---|
| Mortar A | 2251 | 44.2 ± 0.9 | 7.7 ± 0.1 | 5.74 |
| Mortar B | 2173 | 38.6 ± 1.2 | 6.7 ± 0.3 | 5.76 |
| Mortar C | 2172 | 38.2 ± 1.3 | 6.5 ± 0.2 | 5.88 |
| Neat Cement | 1893 | 46.5 ± 1.0 | 4.1 ± 0.2 | 11.3 |
| Aramide Cement | 1941 | 38.4 ± 0.4 | 3.5 ± 0.3 | 11.0 |

The results show that the addition of the aramide capsules to the mortar reduced the density, compressive strength, and tensile strength of the mortar. However, the compressive to tensile ratio of the three mortar samples were substantially similar, indicating that the addition of aramide capsules did not negatively affect the mechanical integrity of the mortar. The results also show that the addition of the aramide capsules to the cement similarly reduced the density, compressive strength, and tensile strength of the cement. However, the compressive to tensile ratio of the two cement samples were substantially similar, indicating that the addition of aramide capsules did not negatively affect the mechanical integrity of the cement. The results also show that mortar has a greater density and tensile strength than cement.

Example 25

A sample of aramide capsules were formed according to the method described. The continuous solvent was a 4:1 cyclohexane-chloroform blend. The surfactant was sorbitan trioleate (Span-85®, Sigma-Aldrich®, St. Louis, Mo.). The continuous phase included the continuous solvent and 2% by volume of the surfactant. The crosslinker was 1,3,5-benzenetricarbonyl trichloride. The dispersed solvent was water. The dispersed monomer was 1,3-diaminobenzene. The dispersed phase included the dispersed solvent and the dispersed monomer.

The aramide capsules were prepared at room temperature. About 16 grams of the dispersed monomer was added to 200 ml of water to produce the dispersed phase. 26.5 grams of the crosslinker was added to 200 ml of the continuous solvent to produce a crosslinker solution. The dispersed phase was combined with 750 ml of the continuous phase. The mixture was stirred for about 30 minutes at about 600 rpm (without turbulent mixing) using a Caframo BDC2002 overhead stirrer forming a w/o emulsion. After 30 minutes of stirring the crosslinker solution was added to the mixture at a rate of about 1 ml per minute. Stirring continued while the crosslinker solution was being added. Stirring continued for an additional 24-50 hours, maintaining the w/o emulsion.

Stirring was stopped and the solid aramide capsules were filtered. The aramide capsules were washed with 500 ml of a sodium bicarbonate buffer solution (1% weight per volume (w/v), pH ~8.3). The aramide capsules were filtered once more and were spread over a flat surface to dry in a vacuum oven at about 82° C. overnight, until no change in weight was observed. Clumps of the aramide capsules were broken up using a 35-mesh screen to form a free flowing powder. The yield was about 65%.

Mortar samples were prepared by hand-mixing a Class G cement, water, a dispersant, silica (Fritz-Pak Corp., Mesquite, Tex.), and additives (such as silica flour, silica sand, and the aramide capsules) for about 1 minute to form a mortar slurry. The dispersant included a superplasticizer, such as Ethacryl G (Arkema, Colombes, France), ADVA XT2 (W.R. Grace and Co., Columbia, Md.), ADVA 600 (W.R. Grace and Co., Columbia, Md.), ADVA 198 (W.R. Grace and Co., Columbia, Md.), sulfonated acetone-formaldehyde condensate (SAFC), or sulfonated naphthalene-formaldehyde condensate (SNFC). Physical properties of the additives are provided in Table 5.

TABLE 5

| Property | Silica Flour | Silica Sand | Aramide Capsules |
|---|---|---|---|
| Specific Gravity (g/mL) | 2.65 | 2.65 | 1.43 |
| Particle Size, Max. (μm) | 75 | 150 | 500 |
| Bulk Density (g/mL) | 1.2 | 1.7 | 0.14 |

The mortar slurry was poured into a 2 inch (equivalent to 5.08 mm) cubic mold. The cubic mold was sealed to prevent water evaporation. The mortar slurry was allowed to set in an unconfined manner for at least 7 days at ambient temperature and pressure. The composition of the mortar samples are provided in Table 6.

TABLE 6

| Sample | Class G Cement (g) | Silica (g) | Dispersant (g) | Water (g) | Additives |
|---|---|---|---|---|---|
| Mortar D (Control) | 33 | 49.5 | 2 (6% bwoc) | 15 (45% bwoc) | — |
| Mortar E (Control) | 33 | 49.5 | 2 (6% bwoc) | 15 (45% bwoc) | 1 g of Silica Flour (3% bwoc) |
| Mortar F (Control) | 33 | 49.5 | 2 (6% bwoc) | 15 (45% bwoc) | 1 g of Silica Sand (3% bwoc) |

TABLE 6-continued

| Sample | Class G Cement (g) | Silica (g) | Dispersant (g) | Water (g) | Additives |
|---|---|---|---|---|---|
| Mortar G | 33 | 49.5 | 2 (6% bwoc) | 15 (45% bwoc) | 1 g of Aramide Capsules (3% bwoc) |

Expansion of the mortar samples was determined by comparing the height of the mortar slurry poured into the 2 inch cubic mold on all four sides and the height of the hardened mortar on all four sides, corresponding to a change in volume of the mortar sample. When comparing Mortar G with Mortar D-F or Mortar E-F with Mortar D, one-way analysis of variance (ANOVA) post hoc Tukey's test was calculated using OriginPro 8.5.1 (OriginLab Corp., Northampton, Mass.) at a 95% confidence interval. Rate of expansion was additionally measured for Mortar G.

Figure 20A:
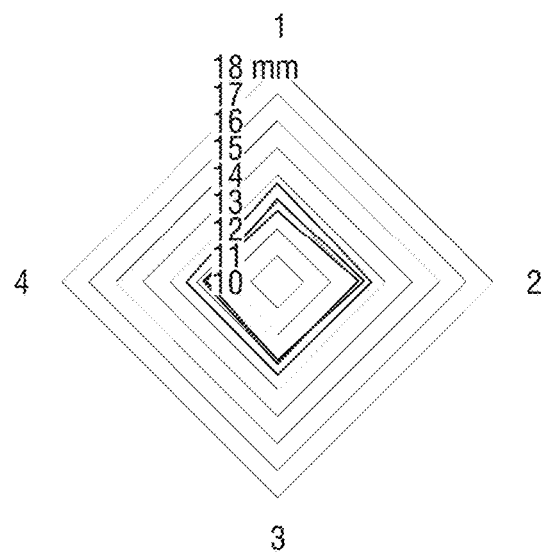
FIG. 20A is a graphical representation showing a radar graph of a mortar sample.

FIG. 20A is a graphical representation showing a radar graph of Mortar D. As shown in FIG. 20A, the solid lines represent three sets of measurements taken for the hardened mortar. The average height obtained from the three sets of measurements for the hardened mortar was 13.1±0.1 mm. There were no statistically significant deviations in height and volume for the three different sets of measurements for the hardened mortar.

Figure 20C:
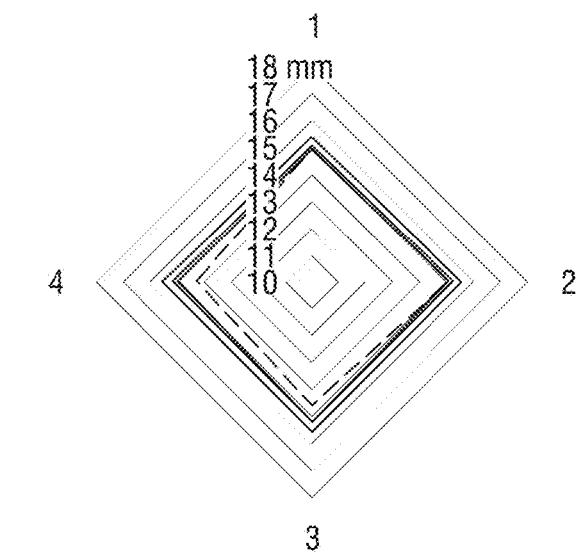
FIG. 20C is a graphical representation showing a radar graph of a mortar sample.
Figure 20B:
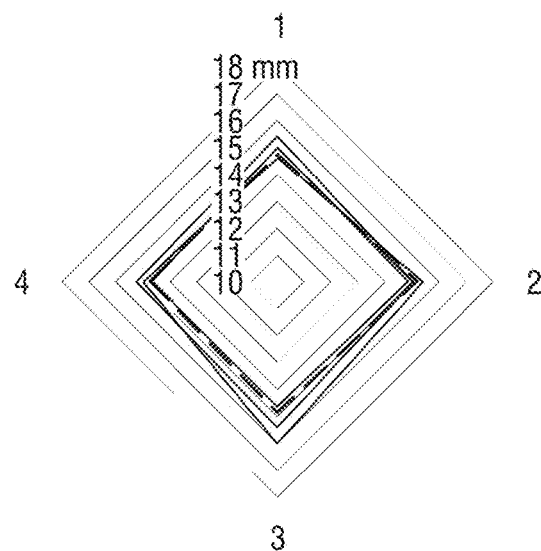
FIG. 20B is a graphical representation showing a radar graph of a mortar sample.

FIG. 20B is a graphical representation showing a radar graph of Mortar E. As shown in FIG. 20B, the solid lines represent three sets of measurements taken for the hardened mortar. The dashed line represents a set of measurements taken for the mortar slurry. The average height obtained from the three sets of measurements for the hardened mortar was 14.73±0.20 mm. The average height obtained from the set of measurements for the mortar slurry was 14.71±0.20 mm, indicating no statistically significant deviations in height and volume before and after the setting of the mortar slurry. There were no statistically significant deviations in volume for the three different sets of measurements for the hardened mortar.

FIG. 20C is a graphical representation showing a radar graph of Mortar F. As shown in FIG. 20C, the solid lines represent three sets of measurements taken for the hardened mortar. The dashed line represents a set of measurements taken for the mortar slurry. The average height obtained from the three sets of measurements for the hardened mortar was 15.25±0.07 mm. The average height obtained from the set of measurements for the mortar slurry was 14.73±0.20 mm, indicating no statistically significant deviations in height and volume before and after the setting of the mortar slurry. There were no statistically significant deviations in volume for the three different sets of measurements for the hardened mortar.

Figure 20D:
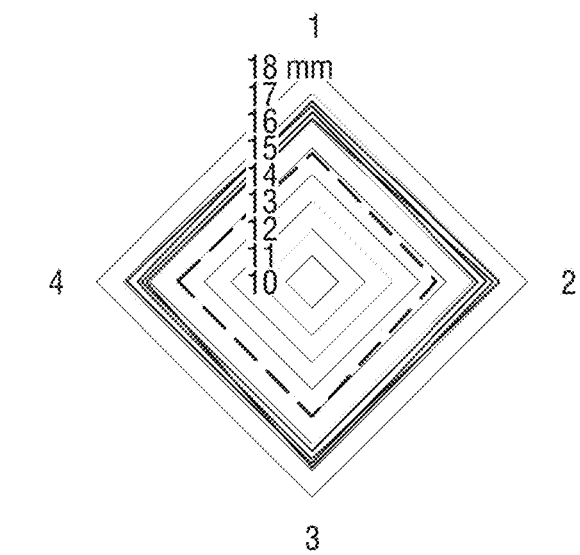
FIG. 20D is a graphical representation showing a radar graph of a mortar sample.

FIG. 20D is a graphical representation showing a radar graph of Mortar G. As shown in FIG. 20D, the solid lines represent four sets of measurements taken for the hardened mortar. The dashed line represents a set of measurements taken for the mortar slurry. The average height obtained from the set of measurements for the mortar slurry was 14.80±0.09 mm. The average height obtained from the four sets of measurements for the hardened mortar was 16.70±0.11 mm, indicating statistically significant deviations in height (about an 11.3% increase after 7 days of curing) and volume before and after the setting of the mortar slurry. There were no statistically significant deviations in volume for the four different sets of measurements for the hardened mortar. Maximum rate of expansion of the height was measured to be about 0.003 mm/min, equivalent to about 7.74 $mm^3$/min in volume, after 8 hours of setting. After 24 hours of setting, the rate of expansion was measured to be about 0.08% increase in volume per day.

Figure 21:
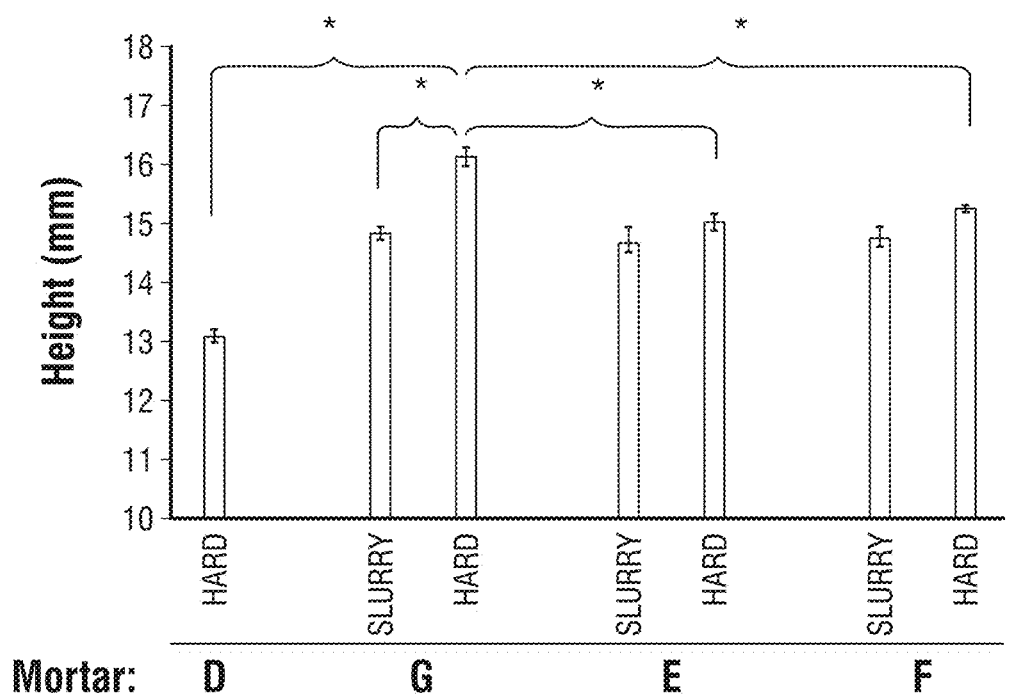
FIG. 21 is a graphical representation showing average heights of the mortar samples.

FIG. 21 is a graphical representation showing the average heights of the mortar samples in mm. The asterisk represents that there is a statistically significant deviation (at a 95% confidence interval) between the two samples, such as between the hardened form of Mortar D (control) and the hardened form of Mortar G, between the slurry form of Mortar G and the hardened form of Mortar G, between the hardened form of Mortar E (control) and the hardened form of Mortar G, and between the hardened form of Mortar F (control) and the hardened form of Mortar G.

The results show that due to the dry aramide capsule having a hollow configuration, it drew water into the core via the semi-permeable polymer shell from water present in the mortar slurry (or from an external water source). The dry aramide capsule expanded as it retained water in the core. Accordingly, the volume of the hardened mortar increased. No gas or byproducts were produced during the expansion. The aramide capsule, upon expansion, did not undergo any chemical reactions, indicative of being chemically inert. The volume expansion occurred autogenously, compared to MgO-based mortars for example, where the volume expansion typically occurs after 7 days.

Density of the mortar samples was determined by first drying and weighing the mortar samples. Subsequently the mortar samples were strung and fully submerged in water to measure the buoyant weight. The ratio between the dry weight and the buoyant weight was used to determine the density of the cement sample comparing with the density of water (1 g/mL). Without being bound by any theory, the buoyant force exerted on the immersed mortar sample is equal to the weight of water displaced by that sample. The density is representative of the volume taken up by the cement, silica, the additives, and any trapped air.

Figure 22:
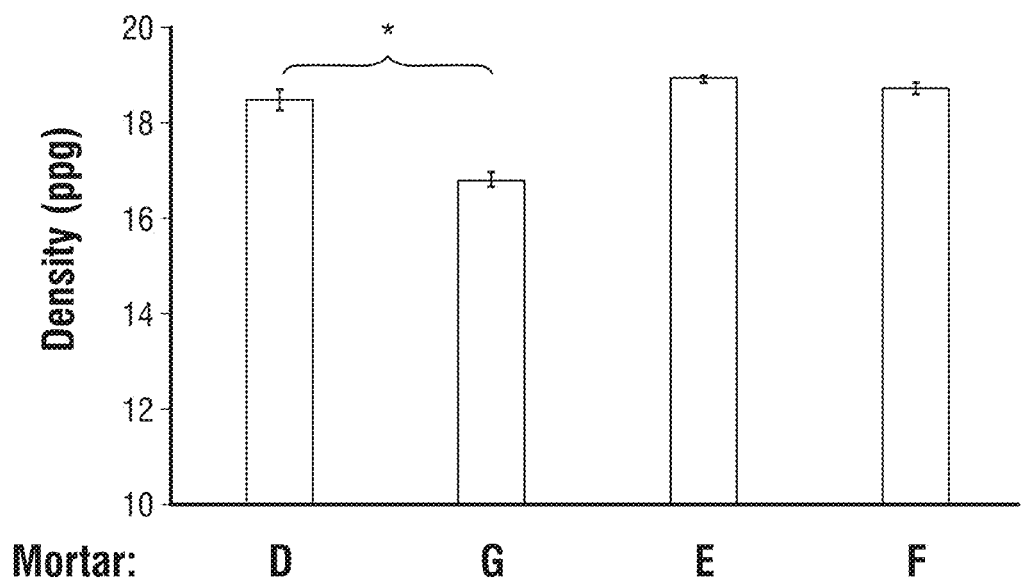
FIG. 22 is a graphical representation showing average densities of the mortar samples.

FIG. 22 is a graphical representation showing the average densities of the hardened mortar samples in pounds per gallon. The asterisk represents that there is a statistically significant deviation (at a 95% confidence interval) between the two samples, such as between Mortar D (control) and Mortar G. The density of Mortar G is about 9.07% less than that of Mortar D.

The results show that Mortar G has the least density among the four mortar samples due to the volume increase induced by the expansion of the aramide capsules via water uptake.

Hardness (or compression strength) of the mortar samples was determined to show changes in mechanical properties. A nondestructive rebound hardness measurement was taken across the 2 inch length of the hardened mortar samples to determine the unconfined compression strength.

Figure 23:
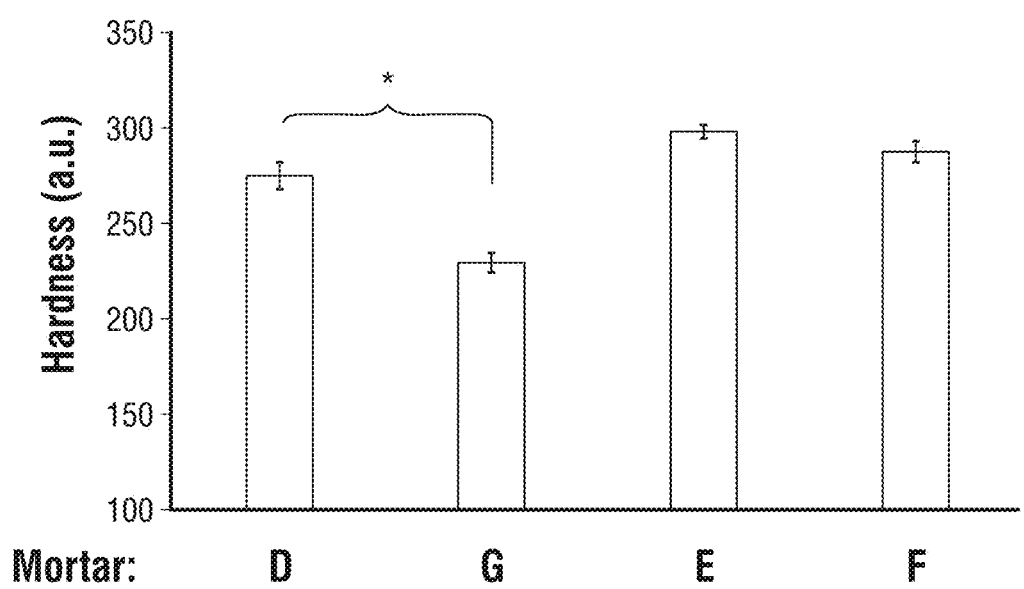
FIG. 23 is a graphical representation showing average hardnesses of the mortar samples.

FIG. 23 is a graphical representation showing the average hardnesses (corresponding to compression strengths) of the hardened mortar samples in arbitrary units. The asterisk represents that there is a statistically significant deviation (at a 95% confidence interval) between the two samples, such as between Mortar D (control) and Mortar G. The hardness of Mortar G is about 16.7% less than that of Mortar D.

The results show that although the inclusion of the aramide capsules in a mortar related to a reduction in compression strength, the reduction did not significantly impact the durability of the mortar. For comparison, other polymeric materials, such as latexes, mixed at 3% bwoc in certain mortars are shown to cause more than a 35% reduction in compression strength, which significantly impacts the durability of the mortar. In addition, because the aramide capsules are chemically inert and are resistant to degradation, the mechanical integrity of the mortar is maintained even in the long term.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for preparing a hardened mortar, the method comprising the steps of:
    mixing an aramide capsule, a cement, a silica, and a water to form a mortar slurry, where the aramide capsule is formed by the steps of:
        mixing a continuous solvent and a surfactant to produce a continuous phase;
        mixing a dispersed solvent and a dispersed monomer to produce a dispersed phase, where the dispersed solvent and the continuous solvent are immiscible;
        mixing the continuous solvent and a crosslinker to produce a crosslinker solution;
        mixing the continuous phase and the dispersed phase to form a mixture having an emulsion such that the dispersed phase is dispersed as droplets in the continuous phase, where an interface defines the droplets of the dispersed phase dispersed in the continuous phase;
        adding the crosslinker solution to the mixture such that the crosslinker reacts with the dispersed monomer;
        allowing an aramide polymer to form on the interface of the droplets, such that the aramide polymer forms a semi-permeable membrane around a core, where the core contains the dispersed phase, such that the semi-permeable membrane around the core forms the aramide capsule;
        allowing the aramide capsule to settle from the mixture;
        separating the aramide capsule from the mixture using a separation method; and
        drying the aramide capsule such that the core is hollow, where the aramide capsule exists as a free flowing powder; and
    allowing the mortar slurry to set to form the hardened mortar, where the aramide capsule is embedded in the hardened mortar.

2. The method of claim 1, where the mortar slurry has a water-to-cement weight ratio ranging between 0.4 and 0.6.

3. The method of claim 1, where the aramide polymer of the aramide capsule is present in the mortar slurry at a concentration ranging between 0.5% and 5% by weight of the cement.

4. The method of claim 1, further comprising the step of: allowing water to permeate from the hardened mortar through the semi-permeable membrane to the core.

5. The method of claim 4, where the aramide capsule is in its expanded form.

6. The method of claim 1, further comprising the step of: allowing water to permeate from the core through the semi-permeable membrane to the hardened mortar.

7. The method of claim 6, where the aramide capsule is in its contracted form.

8. The method of claim 1, where the hardened mortar has a density ranging between 2,100 and 2,200 kilograms per cubic meter.

9. The method of claim 1, where the hardened mortar has an unconfined compressive strength ranging between 35 and 40 megapascals and a tensile strength ranging between 6 and 8 megapascals.

10. The method of claim 1, where the aramide capsule has a diameter ranging between 100 and 200 microns and a wall thickness ranging between 3 and 5 microns.

11. The method of claim 1, where the dispersed solvent is selected from the group consisting of water, ethanol, methanol, and combinations of the same.

12. The method of claim 1, where the dispersed monomer is selected from the group consisting of 1,4-diaminobenzene, 1,3-diaminobenzene, 1,6-diaminohexane, and combinations of the same.

13. The method of claim 1, where the continuous solvent is selected from the group consisting of cyclohexane, chloroform, and combinations of the same.

14. The method of claim 1, where the crosslinker is 1,3,5-benzenetricarbonyl trichloride.

15. The method of claim 1, where the molar ratio of the dispersed monomer and the crosslinker ranges between 1 and 2.

16. The method of claim 1, where the step of mixing the aramide capsule, the cement, the silica, and the water to form the mortar slurry further includes mixing a dispersant including a superplasticizer.

17. A mortar slurry, comprising:
  a cement;
  a silica;
  a water; and
  an aramide capsule, the aramide capsule comprising:
    a semi-permeable membrane comprising an aramide polymer, the semi-permeable membrane forming a shell with a hollow core, the shell configured to expand and contract depending on osmotic properties of a surrounding fluid, where the water is configured to permeate to and from the core through the semi-permeable membrane,
    where the aramide polymer comprises a first subunit derived from a dispersed monomer selected from the group consisting of: 1,4-diaminobenzene, 1,3-diaminobenzene, 1,6-diaminohexane, and combinations of the same, and a second subunit derived from a crosslinker comprising 1,3,5-benzenetricarbonyl trichloride, where the first subunit and the second subunit form an amide group therebetween.

18. The mortar slurry of claim 17, where the mortar slurry has a water-to-cement weight ratio ranging between 0.4 and 0.6.

19. The mortar slurry of claim 17, where the aramide polymer of the aramide capsule is present in the mortar slurry at a concentration ranging between 0.5% and 5% by weight of the cement.

20. The mortar slurry of claim 17, where the aramide capsule has a diameter ranging between 100 and 200 microns and a wall thickness ranging between 3 and 5 microns.

21. The mortar slurry of claim 17, further comprising a dispersant including a superplasticizer.

* * * * *